(12) United States Patent
Daneshvar

(10) Patent No.: US 10,052,994 B2
(45) Date of Patent: Aug. 21, 2018

(54) DANESHVAR CARRIER MEANS AND METHODS IV

(71) Applicant: Yousef Daneshvar, W. Bloomfield, MI (US)

(72) Inventor: Yousef Daneshvar, W. Bloomfield, MI (US)

(73) Assignee: AMERICAN MEDICAL CORPORATION, W. Bloomfield, MI (US)

(*) Notice: Subject to any disclaimer, the term of this patent is extended or adjusted under 35 U.S.C. 154(b) by 164 days.

(21) Appl. No.: 15/143,620

(22) Filed: May 1, 2016

(65) Prior Publication Data

US 2016/0297345 A1 Oct. 13, 2016

Related U.S. Application Data

(63) Continuation of application No. 14/330,123, filed on Oct. 14, 2014, now Pat. No. 9,688,206.

(60) Provisional application No. 62/156,199, filed on May 2, 2015, provisional application No. 62/264,858, filed on Dec. 9, 2015.

(51) Int. Cl.
*B60D 1/00* (2006.01)
*B60P 3/06* (2006.01)

(52) U.S. Cl.
CPC ..................................... *B60P 3/06* (2013.01)

(58) Field of Classification Search
CPC ........... B60R 5/04; B60R 5/041; B60R 9/065; B60D 1/00

USPC ......................................... 224/497, 498, 527
See application file for complete search history.

(56) References Cited

U.S. PATENT DOCUMENTS

| | | | | | |
|---|---|---|---|---|---|
| 3,207,396 | A | * | 9/1965 | Mundell | B60D 1/52 224/486 |
| 3,458,073 | A | * | 7/1969 | Dawson | B60R 9/06 224/924 |
| 3,517,791 | A | * | 6/1970 | Miles | B60P 1/43 14/69.5 |
| 3,912,098 | A | * | 10/1975 | Nicotra | B60R 9/065 224/521 |
| 4,084,713 | A | * | 4/1978 | Rohrs | A61G 3/061 14/69.5 |
| 4,900,217 | A | * | 2/1990 | Nelson | B60P 1/431 14/71.1 |
| 4,991,715 | A | * | 2/1991 | Williams | A45C 5/14 206/335 |
| 5,011,361 | A | * | 4/1991 | Peterson | A61G 3/0209 224/497 |
| 5,033,662 | A | * | 7/1991 | Godin | B60R 9/065 224/506 |
| 5,052,879 | A | * | 10/1991 | Wolfe | A61G 3/06 414/541 |

(Continued)

*Primary Examiner* — Brian D Nash

(57) ABSTRACT

The use of various carrier means such as strollers, wheelchairs, scooters and similar has been very helpful for easing the human life, however lifting and placing of such heavy objects with irregular shapes for placing them inside the vehicle or its trunk is difficult and labor intensive. For this reason this applicant has introduced carriers to the USPTO for helping in this regard by using a compartment with a ramp for moving the objects up and into the compartment and now he introduces improvements and additions to his previous inventions for making the use of such carriers simpler and easier, and even quicker.

24 Claims, 21 Drawing Sheets

(56) References Cited

U.S. PATENT DOCUMENTS

| | | | | |
|---|---|---|---|---|
| 5,199,842 A * | 4/1993 | Watt | ............... | A61G 3/0209 224/497 |
| 5,259,081 A * | 11/1993 | Henderson | ............ | A61G 3/061 14/71.1 |
| 5,431,522 A * | 7/1995 | Ross | ............ | B60R 9/06 224/497 |
| 5,938,397 A * | 8/1999 | Schouest | ............ | B65G 69/30 14/69.5 |
| 6,379,101 B1 * | 4/2002 | Breaux | ............ | B60P 1/43 224/521 |
| 6,783,315 B1 * | 8/2004 | Senechal | ............ | B60P 1/43 224/502 |
| 7,083,373 B1 * | 8/2006 | Boudreau | ............ | A61G 3/0209 414/462 |
| 7,156,273 B2 * | 1/2007 | Morris | ............ | B60R 9/06 108/14 |
| 7,815,083 B2 * | 10/2010 | Clausen | ............ | B60R 9/10 224/497 |
| 7,815,084 B2 * | 10/2010 | Allen | ............ | B60R 9/10 224/519 |
| 7,845,894 B2 * | 12/2010 | Dickinson | ............ | B65D 19/20 414/258 |
| 8,822,885 B2 * | 9/2014 | Daneshvar | ............ | A47B 9/14 108/115 |
| 2002/0154980 A1 * | 10/2002 | Potts | ............ | B60R 9/06 414/462 |
| 2011/0023245 A1 * | 2/2011 | Just | ............ | A61G 3/061 14/70 |

* cited by examiner

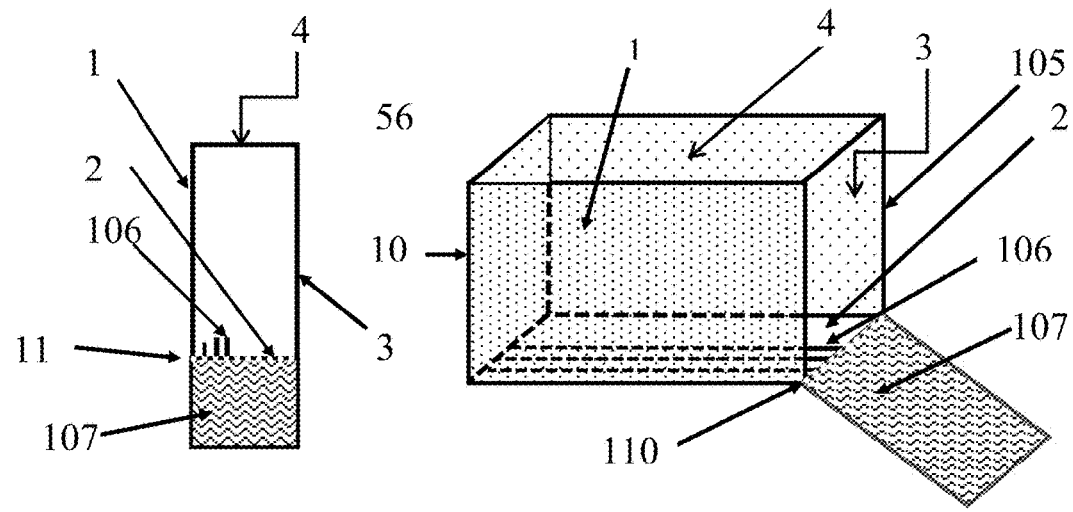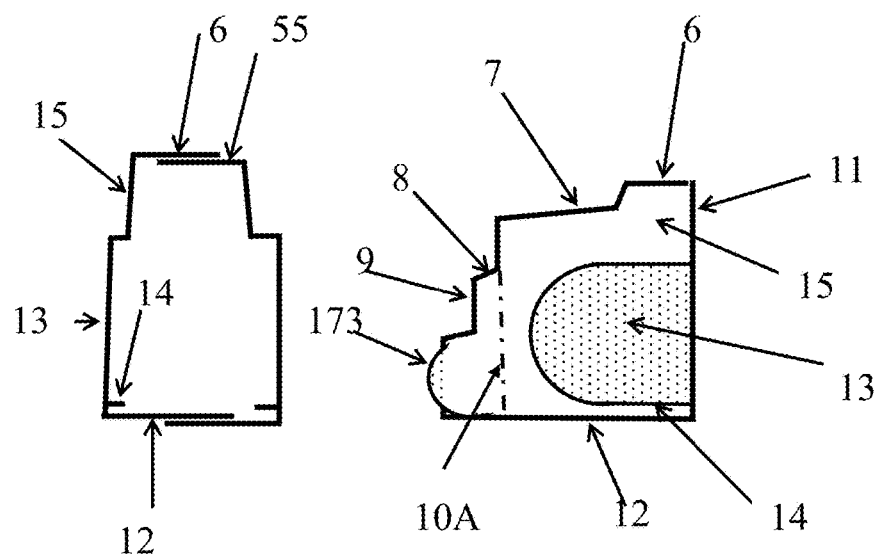

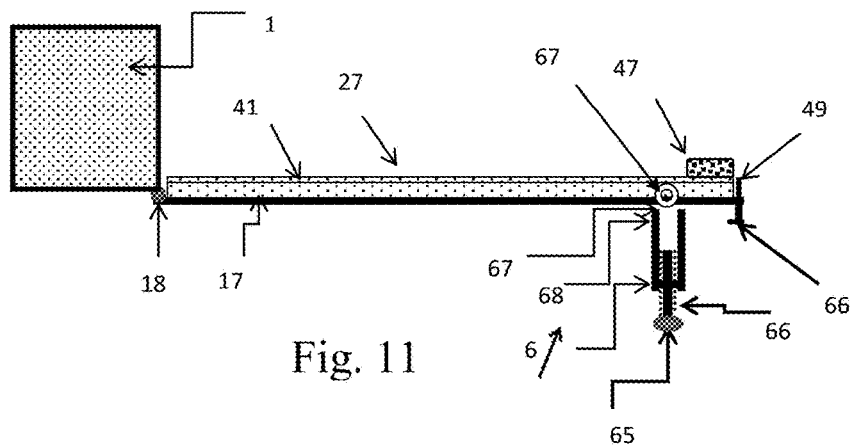
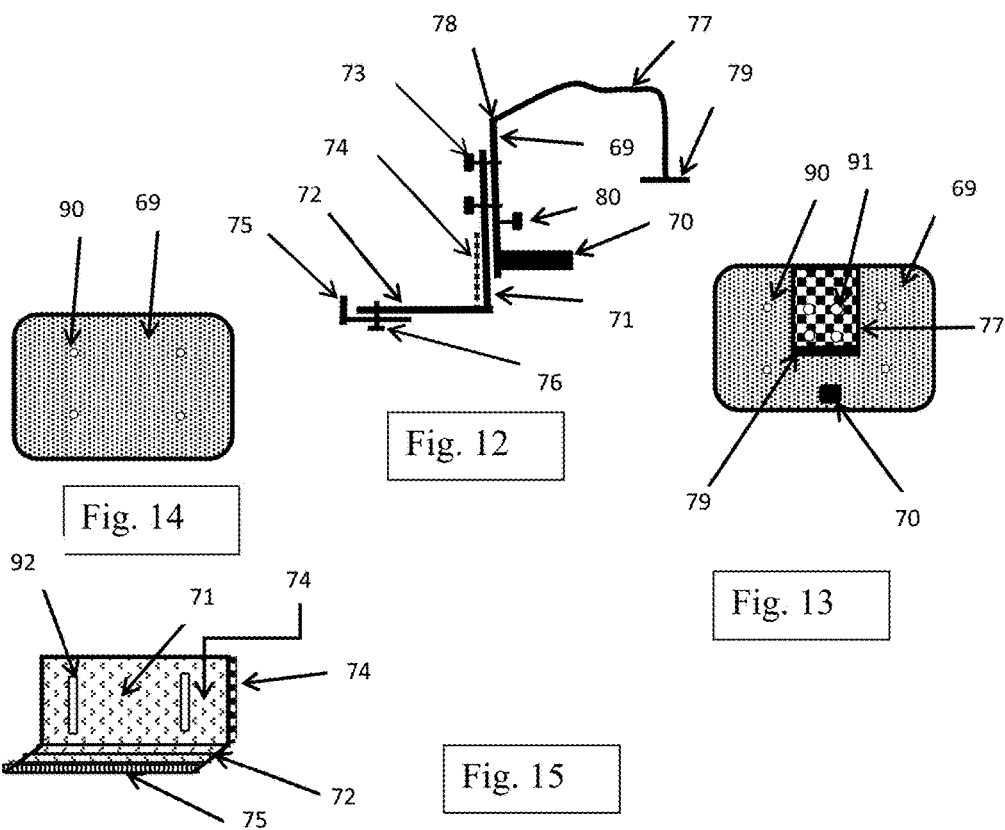

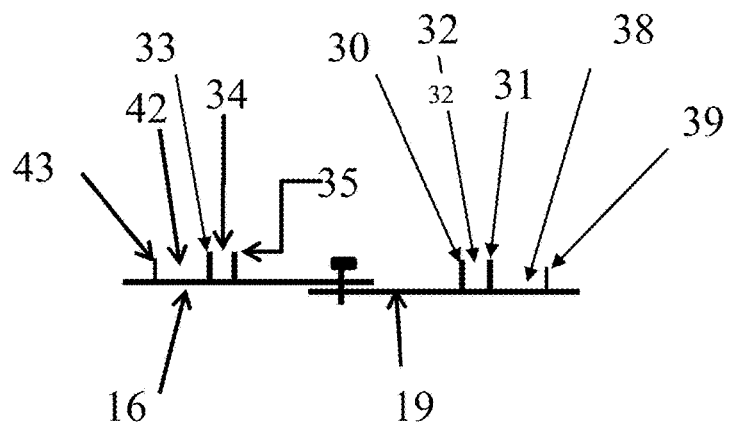
Fig. 17
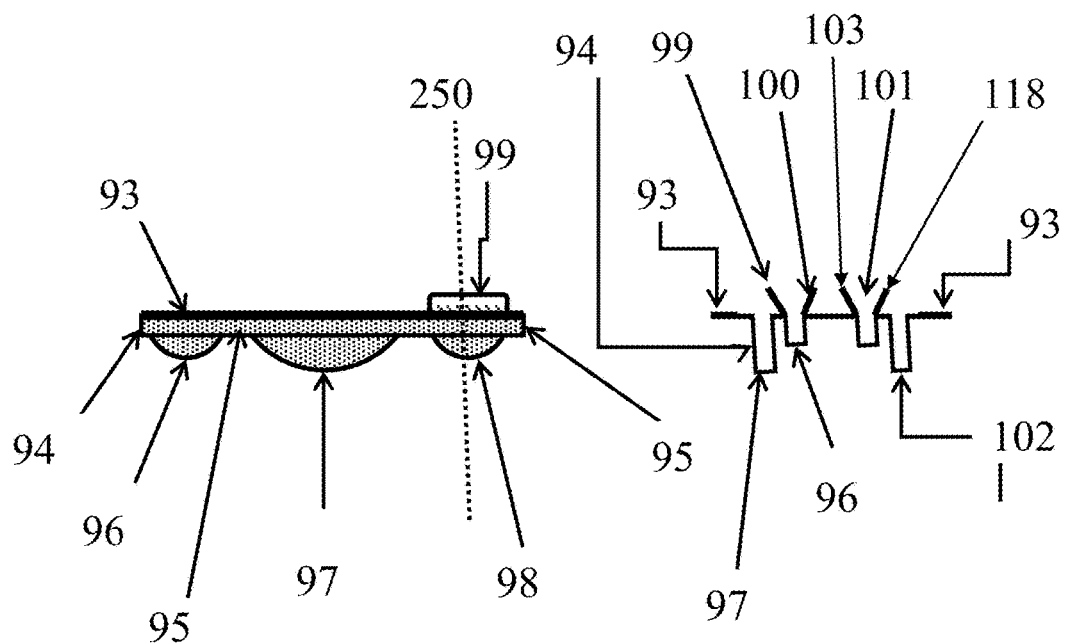
Fig. 18
Fig. 19

DANESHVAR CARRIER MEANS AND METHODS IV

CROSS REFERENCE TO OTHER APPLICATIONS

This application claims the benefit of U.S. application Ser. No. 14/330,123 filed Oct. 14, 2014, U.S. provisional application 62/156,199 filed May 2, 2015, and U.S. provisional application 62/264,858 filed Dec. 9, 2015.

SUMMARY

The use of various objects having wheels such as strollers, wheelchairs, scooters and similar has been very helpful for easing the human life. Commonly these objects are lifted and placed inside a vehicle or its trunk. However, lifting of heavy objects, as well as objects having irregular shapes for placing them inside the vehicle or its trunk, is difficult and labor intensive, particularly when the user has limited physical reserve and power.

The present disclosure introduces a carrier for helping in this regard by using a compartment with a ramp for loading the objects up and into the compartment. In an aspect, the present disclosure considers difficulty in directing and advancing a object being loaded into the carrier, such as a stroller into the compartment, as well as placing the object inside the compartment easily, with or without using ramps.

In an aspect one or more wheels of a object can move independently (i.e. side to side) making it difficult for the user to manipulate or load the object. The present disclosure introduces use of one or more channels, or a set of guidance walls (e.g. a U or L shaped walls), which can be configured to direct the wheels of the objects during loading.

The present disclosure introduces a set of adjustable walls configured to be fixed on a surface of the ramp and/or inside the compartment for making guides or channels for directing the wheels of the incoming objects being directed inside the guides/channels for moving forward with ease.

The present disclosure introduces a ramp and a floor of the compartment having a shaped means and channels that allow the wheels of the objects to be easily guided or manipulated such that the object can be moved forward and backward with significant control.

A method is disclosed to allow a position of the compartment compared to the vehicle to be adjusted such that the compartment can be placed in an upper, lower, to right or to the left of a rear of the vehicle (i.e. in a most convenient place for use). A method is disclosed to allow these carriers to be attached to a body of the vehicle with more than one means. A system is disclosed that will allow the user to move a wheelchair or similar into a compartment in the rear of the vehicle in a significantly short time and without significant energy expenditure or difficulty.

THE BRIEF EXPLANATION OF THE INVENTION

The present disclosure introduces new and modified models of carrier means for use with wheelchairs, strollers, scooters and other wheeled objects for being pushed easily inside a compartment in the rear of an vehicle.

This compartment will be attached to the rear of a vehicle by an adjustable attachment means. In one of such model the compartment has a door which opens and can be placed on the ground for functioning as a ramp. This ramp has a series of adjustable short walls, or adjustable or fixed channels on its upper surface for creating channels for accepting the wheels of the incoming object, such that the wheels will be moved in the direction which is designed.

This application also introduces a special method and a mechanism which allows objects with front and the rear wheels to be moved by initially placing their front wheels on the ramp or on the floor of the compartment then using the front wheels as a means for allowing the rear wheels for be lifted and moved into the compartment with significant ease.

The present disclosure describes a method for a process of loading the object with ease. These new carriers and the methods allow a controlled movement of the objects. So that by controlling the wheels of the incoming object, the object will move in the desired direction. The compartment may have springs means in their walls or means such as pad means and other restraint means designed for preventing the object inside the compartment from moving. In the carriers having ramps, after the object is moved by the ramp inside the compartment the ramp means can be configured to closed and used as a door and be locked to keep the object inside safety. Thus this method will simplify this process significantly and will practically eliminate the need for bending and lifting of the objects. The compartment can also function as a protector from rain, snow and harsh environment.

The present disclosure also introduces a carrier which will not use the ramp as a door since the floor of the compartment with use of their special floor and use of new method of use allows the wheeled objects to be placed inside the compartment with significant ease. The application also suggests various adjustable means for allowing the compartment to be attached to the body of the vehicle. Also, a hinge means may be used in order to allow the compartment to swing away from the body of the vehicle for allowing access to the rear of the vehicle or the trunk.

THE FIGS

Importantly, please note that many of the options shown in various Figs. are designed for use in one model if applicable. Please also note that the options shown in previous Figs. shown in previous applications may be also used with these new models.

BRIEF EXPLANATION OF THE FIGS

FIG. 1. Shows a rectangular prism shaped compartment which one of its walls shown at right functions as a door and a ramp.

FIG. 2. Shows the side view of the compartment shown in previous FIG. 1 which in this view is being looked from the entrance to the inside of the compartment.

FIG. 3. Shows the side view of a compartment which its body is modified by adopting the shape of the incoming object such as a wheelchair.

FIG. 4. Shows schematically the cross cut side view the modified compartment shown in previous FIG. 3.

FIG. 5. Shows the side view of a compartment means made of two mirror image pieces attached to each other by a third piece.

FIG. 6. Shows the top view of the door/ramp of a compartment which consists of 2 overlapping pieces attached to each other by screws.

FIG. 7. Shows the top view of the floor of the compartment and the door/ramp which are hinged to each other at 18.

FIG. 8. Shows the cross cut view of the lower piece of the carrier shown at FIG. 7. This piece is the ramp and the cut is aligned in the line 115 of FIG. 7.

FIG. 9. Shows an expanded cross cut view of the lower piece of the carrier shown at FIG. 7; the door/the ramp along the dotted line 116.

FIG. 10. Shows the cross cut view of the lower piece of a carrier similar to the carrier shown at FIG. 9. Except this door/ramp is made from combinations of 3 sheets.

FIG. 11. Shows the side view of the carrier shown in FIG. 7. Except this Fig. shows a height control means located under the lower surface of this wall/ramp at 64.

FIG. 12. Shows the side view of an adjustable attachment means which allows the object means to be attached to the rear of an vehicle.

FIG. 13. Shows the rear view of the attachment means 69-70 and its attached pieces such as strap means 77 and end means 79 shown in FIG. 12.

FIG. 14. Shows schematically the front view of the attachment means 69 which has a rectangular shape with many holes one shown at 90.

FIG. 15. Shows the front/oblique view of the L-shaped, carrier shown in FIG. 12. This Fig. shows the rectangular shape of the metal plate 71 and the horizontal plate 72.

FIG. 16. Shows the top view of the floor of a compartment which only its floor is modified by having channels created by vertical/perpendicular walls.

FIG. 17. Shows the cross cut view of the lower piece of the carrier shown at FIG. 16. Along the line 120.

FIG. 18. In coordination with FIG. 19 shows the floor of a compartment which the channels are located below the surface the horizontal floor 93 of the compartment.

FIG. 19. Shows the side view of the floor of the compartment shown in FIG. 18. In which the channels are located below the surface of the horizontal floor of the compartment.

FIG. 20. Shows the cross cut view of a carrier similar to the carrier in FIG. 9 except this carrier is made from combination of multiple pieces attached to each other for allowing the distances of different pieces to be adjusted.

FIG. 21. Shows the side view of a shaped compartment means which does not have a ramp and its door is hinged to its rear wall.

FIG. 22. Shows the top view of the floor of a shaped compartment means which does not have a ramp.

FIG. 23. Shows the side view of the floor of the compartment shown in FIG. 21 and FIG. 22.

FIG. 24. Shows the side view of a rectangular block means shown at 178 in FIG. 23.

FIG. 25. Shows the side view of a connection means which is designed to allow the L shaped carrier shown in FIG. 15 to attach to the rear of the vehicle.

FIG. 26. Shows the top view of the connection means shown in previous FIG. 25.

FIG. 27. Shows the side view of a floor of a compartment shown in FIG. 23 in which the floor 170 curves down at point 181 to create the piece 188.

FIG. 28. Shows the top view of the floor of a compartment shown in FIG. 27.

FIG. 29. Shows the side view of a commonly used wheelchair.

FIG. 30. Shows schematically a motorized means which allows a wheelchair and similar to be pulled inside the compartment easily.

FIG. 31. Shows schematically the side view of a modified compartment means which has an upper half door and a lower half door and half ramp.

FIG. 32. Shows the side view of a floor of a compartment shown in FIG. 27 except it shows a hinged half rear door/ramp.

FIG. 33. Shows a compartment 310 which is attached to an L-shaped means shown at 71-72 by use of the vertical hinge 74 which allows the compartment 310 to be moved laterally in order to access the trunk.

FIG. 34. Shows a compartment 310 attached to an L-shaped means shown at 72 which is attached to the means of an attachment to the vehicle by use of a horizontal hinge 311 for tilting.

FIG. 35. Shows a compartment 310 which is attached to the rear means of vehicle by the carrier shown at 312-313.

FIG. 36. Shows a means 312-313 made from an outer strong enclosure 313 which allows an insert 312 to move in and out.

FIG. 37. Shows the floor of a compartment which has four channels with reflective zones on its lower end for guiding the user.

DETAILED EXPLANATION OF THE FIGURES

Figure 5:
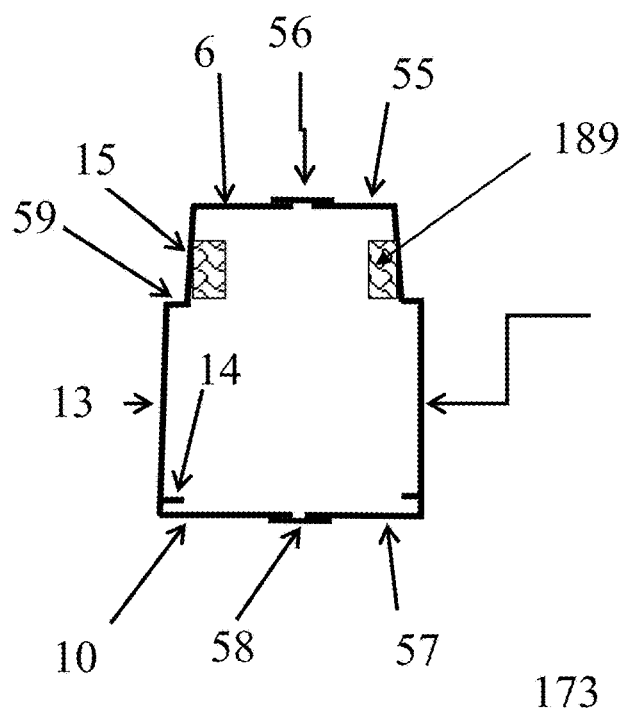

FIG. 1. Shows schematically a rectangular prism shaped compartment consisting of six walls. One wall in the right side, shown at 107 is hinged to the body and functions as a door as well as a ramp means. The body of the compartment and the door will be attached to the rear of an vehicle for carrying objects. The opening of this compartment allows a wheeled object such as wheelchair, a stroller, a walker with wheels or similar to be inserted inside the compartment for being carried in the side of an vehicle. The lower wall 2 of this compartment is equipped with a series of raised/vertical walls creating channels for directing the wheels of the incoming object in a designed fashion. One such vertical wall is schematically shown at number 106. Two of these vertical walls will make a channel at shown in FIGS. 2, 7 and 8, which will accept the wheels of a object and allows the wheels of such incoming object to fall inside these channels and be directed in a given direction. The wall 4 shows the top wall of this compartment and the front wall is shown at 1 and the entrance of this wall is shown at 105. A hinge means shown at 110 attaches the door 107 to the floor 2 or the components of the compartment.

FIG. 2. Shows schematically the side view of compartment shown in previous FIG. 1 which in this view is being viewed from the entrance 105 to the inside the inside of the compartment. In this Fig. the floor of the compartment is marked at 2, the rear wall at 3 and the front wall at 1. Three short, vertical walls are shown in the left side of the floor 2 and one of them is marked at number 106. Please note, as shown in previous Fig., these vertical walls will cooperate to create channels which allow the wheels of the incoming object to be directed in the direction desired.

FIG. 3 shows schematically the side view of a modified compartment shown in previous FIGS. 1 and 2 which in this case the configuration of the compartment is modified for adopting the shape of the incoming object; in this model the object is a wheelchair. In this model the compartment is made of two mirror imaged pieces shown better in FIGS. 4 and 5 at 6 and 55. These two pieces are attached to each other for making a complete carrier. This view shows the front wall of this compartment. In this model an expanded empty space 13 is designed for reducing/eliminating the space between the walls of the compartment and the side body of the incoming object, such that the carrier will function like a matching cradle for the incoming object and will keep the incoming object securely inside.

In this Fig. the upper wall is modified by having a series of short walls attached to each other, shown at 6, 7, 8, 9, and 173, to name few. These walls move in steps eliminating the extra spaces which are present in the model shown at FIG. 1. For example, the upper wall 6 is the highest wall of this compartment and allows the handles of the object to be placed inside. Then with a short oblique step it attaches to the wall 7, with another vertical step it attaches to the wall 8, and then the vertical wall 9. Then by use of two short walls it attaches to the wall number 173. Wall number 173 is a curved wall designed to accept and hold the small front wheels of the object. Such a design mimics the curves of the incoming object in three dimensions and will allow some of these walls to touch and hold the parts of the incoming object or they will be very close to them and will prevent the incoming object from jiggling or extra movement. Thus the object will be secure and sturdy inside this compartment.

The lower surface of this wall means is shown at the 12 and it matches or makes the floor of the compartment. Also in this wall there is a particularly shaped area, shown at number 13, which is designed to accept the circular portion of the large wheels of the object, which has a wheel of its own and is commonly used for the users to propel the object forward/backward by rotating the rear large wheels. This area not only accepts such $3^{rd}$ circular wheel of the object, but also the front part of this wall shown at 10 will prevent the $3^{rd}$ wheel from moving forward unwantedly. The mirror image of this wall is shown in the right side of the FIGS. 4 and 5. In this Fig. number 11 shows the entrance of this compartment. Number 15 shows the front wall of this carrier and number 14 shows the lower rim of the area 13. The line shown with dash and dot at 10A is shown to indicate that the compartment shown in this Fig. may be made from two matching pieces attached to each other, the first piece in the left side of this Fig. and the second piece in the right side of this Fig., so that they can slide over each other for making an adjustable carrier. If a longer object is used these pieces can be moved away from each other to accommodate, in contrary if a short size object is used these two pieces may be moved close to each other to create an overall smaller compartment.

FIG. 4. Shows schematically the cross cut side view of a modified compartment shown in previous FIG. 3. This Fig. is designed and intended to show that the compartment may be made from combination of 2 or more matching pieces attaching to each other for making a single compartment. This Figure also shows that the walls of this compartment are not made of a single straight sheet but it is designed to be a modified shape so that the extra space between the object and the inner surface of the compartment would be very limited. For example, on the left half of this compartment the upper wall shown at number 6 is horizontal wall, which connects to a shorter sidewall 15, which moves to the left and is attached to an almost vertical wall 13 with a narrow piece. On the inner surface of the wall 13 there is a short wall 14. The expanded outward wall 13 will accept and accommodate the third wheel of the object for manual manipulation. The lowest surface of this piece is shown at a horizontal wall 12 which will be part of part of the floor of the compartment.

Also this Fig. shows the mirror image of the piece mentioned on the right but is not marked for preventing a crowded Fig. The different parts of the mirror image piece shown in the right side of this figure are shown, but are not marked. Please note by using various attached pieces the body of the compartment may be made from 2 or more pieces. The use of smaller pieces, not only allows the manufacturing process to be easier, but also the use of short bent walls will make them strong and prevent them from bending and disfiguration with force.

FIG. 5. Shows schematically the rear view of a compartment means similar to the model shown in previous FIG. 4., except in this model the 2 mirror image pieces shown at number 6 on top of the first carrier and number 55 on the top of the second carrier are attached to each other by a connecting means shown at 56 on the top and 58 on the bottom. Please note the use of the connecting means allows the overall width of this compartment to be adjusted, depending on how much of the connecting means are functionally used. This method allows a given compartment to be adjusted for use of narrow and wide objects alike. The use of the screws or other attachment means will be used for the attachment of these three pieces, however, they are not shown in this Figure.

Figure 6:
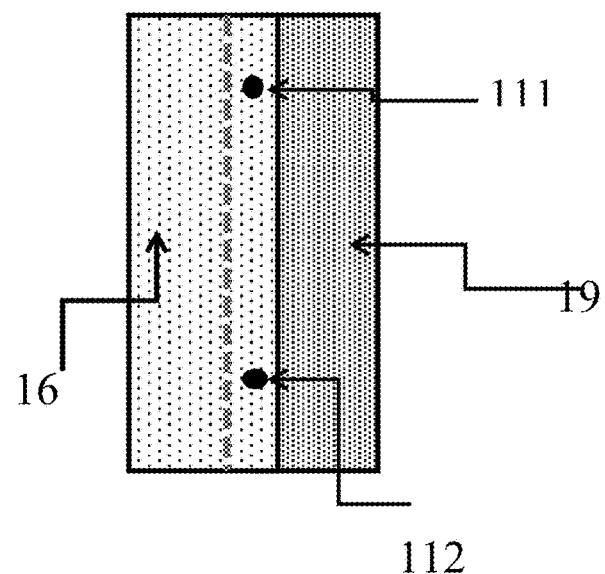
Figure 8:
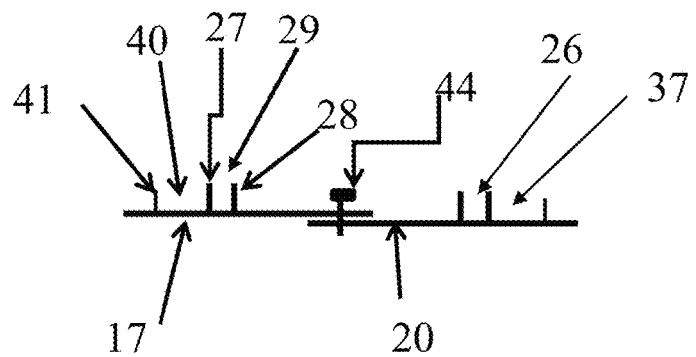

FIG. 6. shows schematically the top view of the door=ramp of the compartment=compartment, which comprises of 2 pieces. The first piece is shown at 16 on the left side and the second piece is shown at number 19 on the right side. This implies that the floor as well as the door/ramp of this carrier can be made from 2 matching overlapping pieces and fixed by attachment means such as screws. This method allows the size of this piece to be adjusted. Importantly, use of this design allows this piece to be made from combination of more than two pieces in order to allow both the length and the width of this door or the ramp to be adjusted. Thus, the floor of the compartment and the ramp can be adjustable. FIG. 8 also shows the cross-cut side view of such a carrier. In this figure the first sheet is shown at 16 the second sheet is shown at 19 and screws 111 and 112 are fixing these pieces together an adjustable fashion.

Figure 7:
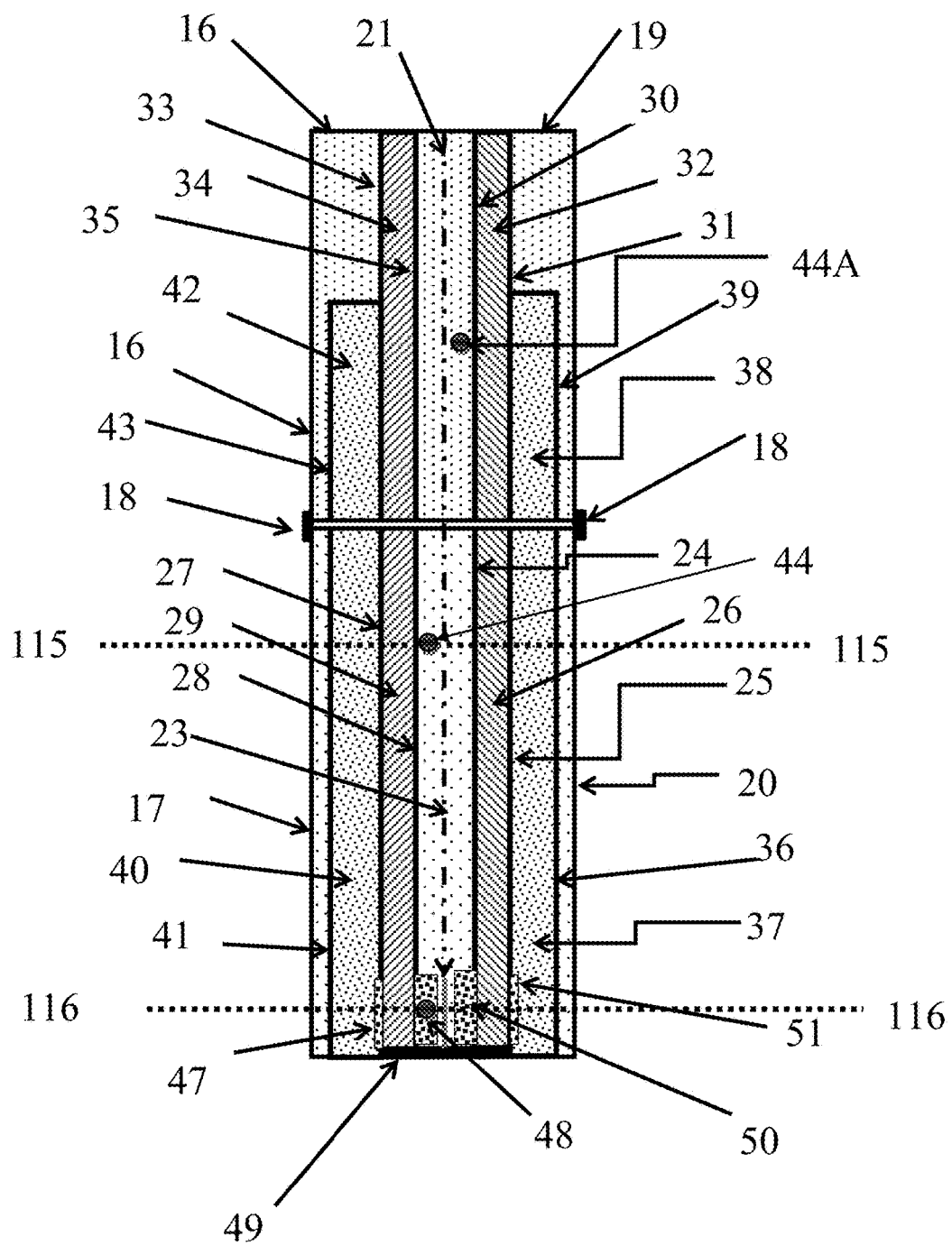

FIG. 7. Shows a schematically the top view of the following parts:
A. An upper piece shown in the top half of this Fig. and consists of the floor of the compartment when it is being viewed from up toward down direction.
B. A lower piece which functions as a door as well as a ramp. These two pieces are hinged to each other by a hinge means shown almost in the middle of this carrier shown at 18 in the left and the right side.

The upper piece consists of 2 relatively flat sheets of metal or similar, shown at 16 and 19, which overlap and are adjustably fixed to each other by screw means. This is shown at 44A for making one functional sheet for functioning as the floor of the compartment. Also in the lower part of this Fig. the wall of the compartment is shown. Which is also made of two sheets of metal or similar at 17 and 20, which this combination is also fixed to each other by means of screw 44. Thus:

A. The upper part shows the top view of the floor of the compartment, consisting of 2 sheets of metal or similar, shown at 16 and 19, which are overlapping and are adjustably fixed to each other by screw means, shown at 44A for making one functional sheet of material. Also in the lower part of this Fig. the wall of the compartment is shown. This piece is also made of 2 sheets of metal or similar at 17 and 20, which these pieces are fixed to each other by means of screw 44. Therefore the size of the door can be adjusted. The lower part shown at 17 and 20 will function as a ramp, as well as a door. The overlapping line of sheets 17 and 20 is shown at 23, which in this case, is aligned with the overlapping line 21 shown in the upper part of this Fig.

On the lower right side of this Fig. note two walls 24 and 25, which create a channel in between shown at 26. This channel starts from beginning of this door/ramp and continues until the hinge means 18 until it meets a matching part on the floor 19 of the compartment shown in the upper part of this FIG. In the upper part of the Fig. two vertical walls 30 and 31 create the channel 32, such that when the right front wheel of a object is placed initially in the channel 26, it can be pushed forward to pass the hinge 18 and enter the channel 32 on the floor of the compartment and be parked. In the left side of the Fig. a similar and a mirror image of the channels 26 and 32, are shown at 29 and 34.

On the left side of door/ramp area of this carrier shown in the lower part of this Fig. two vertical walls. 27 and 28 are shown which have created the channel 29. Also the floor area of the compartment, shown at upper part of this Fig. on the left side the walls 33 and 35, have created the Chanel 34. So that when the front, left, wheel of the object is placed inside the channel 29 on the ramp/door it can be pushed forward to pass the hinge means 18 and enter into the channel 34 of the floor of the compartment.

In an aspect, the vertical wall 36 in the ramp area in the right side of the ramp/door which has created a second channel shown at 37. This channel will accept the large, rear, right side wheel of the object and will allow it to move forward and pass the hinge means 18. After passing the hinge means 18 the rear, right side wheel of the object will enter inside the channel 38 created by the vertical wall 39 on the floor of the compartment=the compartment. It should be noted that the compartment will be attached to the rear of an vehicle. In the left side of the lower part of this Fig. the parallel channel 40 is shown which is created by the vertical wall 41 with corporation of the wall 27 of the channel 29. The channel 40 is designed for accepting the large, left side rear wheel of the object and will allow it to move forward and pass the hinge means 18 to enter the channel 42 on the floor of the compartment created by combination of the vertical wall 43 and the wall 33 from the channel 34.

The lower part of this Fig. shows four small rectangular areas marked at 47, 48, 50 and 51. These pieces are oblique vertical walls (wings) which are attached to the vertical walls of the lower end of the door/ramp which are better shown in FIG. 9. The functions of these oblique vertical/pieces (wings) are to facilitate the entrance of the small front wheels of the object to the channels 29 and 26 respectively. So that when the small front wheels come vertically to enter inside the channels 29 and 26 they will slide down when they touch the oblique walls and enter inside the channels 29 and 26 with ease. These are shown better in FIG. 9. Please note that in some cases the walls 47 and 51 may not be present.

FIG. 8. Shows schematically the cross cut view of the lower piece of the carrier shown at FIG. 7. This piece is the door/ramp of the compartment. This cut is aligned in the transverse line 115 going through one side to another. In this Fig. the screw 44 goes through the sheet 17, then the sheet 20 holding these two sheets of metal together securely, allowing the width of this piece to be adjusted. Importantly, a similar method can be used to allow the length of this piece also to be adjusted. In this Fig., the sheet of the metal in the left side, is shown at 17 and for the right side, is shown at 20. The screw 44 goes through the sheet 17 through the sheet 20 and holds them together. In the left side of this Fig. three vertical walls, 27 and 28 and 41. The vertical walls, 27 and 28 create the channel 29 for allowing the small front wheel of the object to move front and back inside and along with this channel. The vertical wall 41 works in combination with the vertical wall 27 for making the channel 40, allowing the large rear wheel of the object in the left side to roll along this channel 40. Please note that the other side of this door has the mirror image of the same walls explained in this Fig., and they create two channels; the first channel 26 for allowing the small front wheel to move along, and the second channel 37 will allow the larger real wheel of the object to move through. However, in order to prevent from a crowded Figs, the walls are not marked.

Figure 9:
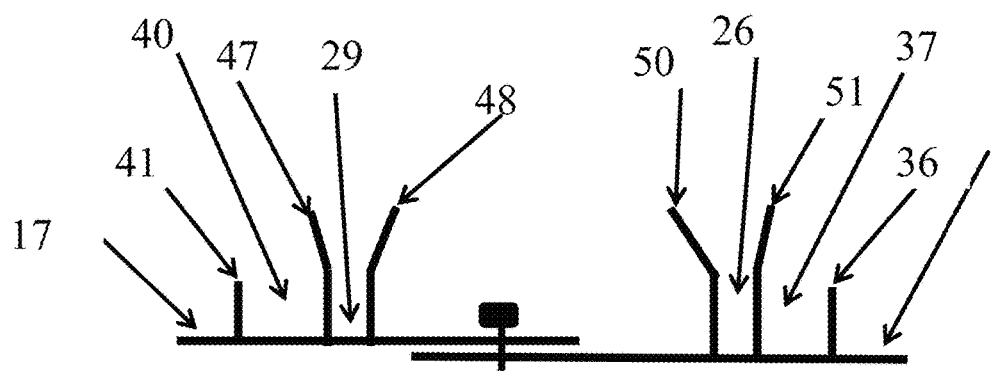

FIG. 9. Shows schematically the cross cut view of the lower piece of the carrier shown at FIG. 7 (the door/the ramp) along the dotted line 116. This cut is for showing the small rectangles (wings), 47, 48, 50, and 51.

These rectangular pieces attaches to the lower vertical walls and here only the oblique pieces are marked to prevent a crowded Fig. The importance of this design is that it will direct the small wheels of the object coming in an up to down direction (which will be further explained later in this application) to hit the oblique walls, slide and fall inside the channels easily and then to move.

The channels are for use in the following sequences:
A. The small, front wheel in the left side of the object will fall inside the channel 29.
B. At the same time the small front wheel in the right side of the object will fall inside the channel 26.
C. After the small, front wheels moved about 17-18 inches forwardly inside the channel 29 and 26 then the large, rear wheel in the left side will move into the channel 40 and will move forward parallel to the small front wheel in the left side of the object.
D. At the same time the large, rear wheel in the right side will roll into the channel 37 and will move forward parallel to the small front wheel in the right side.

Thus at this point all of the four wheels of the object are placed inside the parallel channels and will move forward. The presence of the channels will make such moves secure and controlled so that the wheels will not be able to move from side to side and make the object out of control. When the front wheels are under control practically the whole object may be controlled. The front movement will continue until the front wheels will enter inside the matching channels on the floor of the compartment and will move forward and then their rear large wheels will also follow the move and they will enter inside their channels on the floor of the compartment, which is designed for their entrance. After a short distance the front wheels will reach the inner surface of the front wall and will stop. This is their destination inside the compartment in which is designed for them to park. The presence of small blocks, or the springs in the side walls of the compartment or the presence of pads and/or the slope of the base carrier will keep the object inside the compartment securely, so that the user will have a chance to close the door of the compartment and lock it secure.

Importantly:
A. The numbers of these walls.
B. The locations of these walls.
C. The relative locations of these walls compared to each other.
D. The height of these vertical walls.
E. The thickness of these vertical walls.
F. And all other important related specifics of these vertical walls may vary in order to allow the use of these carriers with different objects, which may have different distances of wheels from each other and may need adjusted vertical walls.

G. In this subject please note that the walls 43 and 39 may be eliminated in some models since the sidewalls of the compartment would prevent from large wheels to move sidewise.

Figure 10:
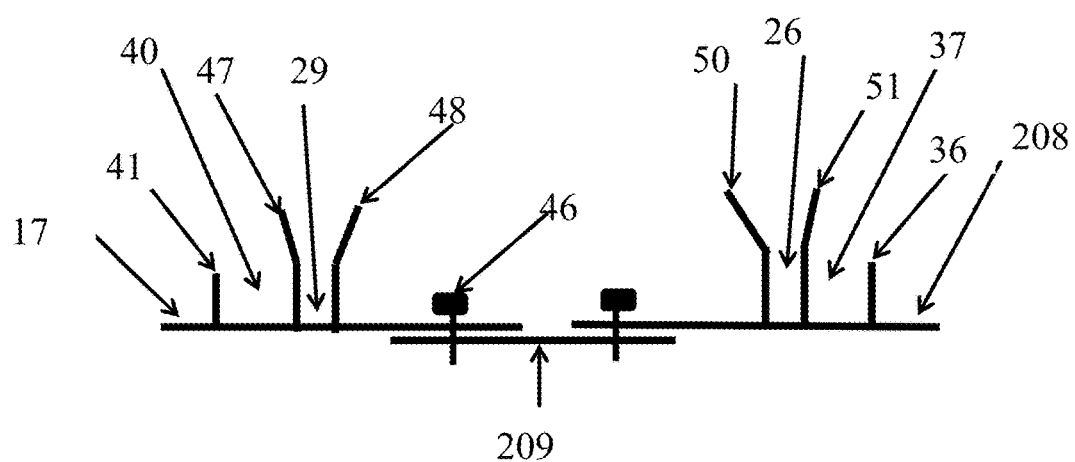

FIG. 10. Shows schematically a cross cut view of the lower piece of a carrier similar to the carrier shown at FIG. 9. Except this Fig. shows a door/ramp piece, which is made from combinations of 3 sheets. As shown in 17, 208 and the complementary sheet 209. The sheet 209 attaches to the sheets, 17 and 201 in an adjustable fashion allowing the width of the combination to be changed and to be adjustable, such that it allows a object or similar with different widths to be accommodated inside this carrier. In this Fig. the sheets, 17, and 208 is shown with a series of vertical-oblique pieces, shown at 47, 48, 50 and 51. As well as the shorter vertical walls, shown at 41 and 36, allowing the channels 40, 29, 26 and 37 to be made. The screw is shown at 46, goes through the sheet 17 and 209, and attaches them, similarly there is a screw in the right side of this Fig., attaching sheets 208 and 209 but is not marked.

FIG. 11. Shows schematically the side view of the lower piece of a carrier similar to the carrier shown in FIG. 7. Except this Fig. shows a specific height control means which is located under the lower surface of this wall/ramp which is designed to allow the height of this part in the lower part of the wall/ramp to be modified: To be increased or decreased. Please note that the ramp will be tilted to come too close to the ground. Therefore a vertical height control pole is designed to prevent it from touching the floor and also to stand the sturdy. In this figure the body of the compartment is schematically shown at 1 and is attached to the door/ramp means by hinge 18. The height control means is a tubular shaped body shown at 68 with a vertex shown at 64 and a base 67 which is hinged to the lower surface of the ramp by hinge 67.

The vertex 64 accepts a screw means 66 to rotate on it, moving up and down, such that the effective length of this piece can be adjusted. The tip of this screw means is attached to a rounded piece sown at 65 so that by rotating the head the screw it will move up and down allowing the position of the head piece 65 to be adjusted, thus making the free end of door/ramp to move up or down from the ground. Note the hinge means 67 will allow this carrier to be in a vertical position when the ramp is open and when the ramp is closed it will be close to the body of the ramp due to the power of gravity and will be secured under surface of the ramp. On the upper surface of the ramp 17 the vertical walls 41 and 27 are shown, which they can be seen in the lower part of FIG. 7 as well. Also the side view of the oblique wall 47, its location and relative size is also shown. Note: the height of the vertical wall 41 is less that the vertical wall 27. The differential height is a feature since the wall is between the lateral wall of the large rear wheel and the inner wall of the third wall, which is for manual propelling of the object. Within the object, there may be many small round horizontal pieces going from the side of the large rear wheel to the third wheel and limits the height of the wall 41 which is located in the same area. The side view of the hinge means 18 is also shown.

FIG. 12. Shows schematically the side view of an attachment means which allows the compartment or the compartment to be attached to the rear of an vehicle for being carried. This carrier consists of multiple pieces, such as: a first vertical plate 69, which is strong, rectangular sheet of metal which is also shown in FIGS. 13 and 14. This vertical plate has A rectangular metal pole shown at 70 which is made of steel with a rectangular crosscut shape and with a diameter which allows it to be inserted inside a commonly used attachments means in the rear of the vehicle designed for carrying objects such as boats, motorcycles and similar.

The attachment means simply will function to allow this compartment to be securely attached to the rear or body of an vehicle. After the connection of the vertical plate 69 to an vehicle then an L-shaped, sturdy carrier made from steel plates shown at 71 and 72 will be utilized for allowing the compartment to sit on top of the horizontal plate 72 of this carrier for being carried. The vertical plate 71 of this carrier is a rectangular, piece as well as a horizontal plate shown at 72, both are shown better in FIG. 15. The compartment or the compartment will sit on the top of the horizontal plate 72. The vertical piece 71 of the attachment means will be attached to the vertical plate 69 of the attachment means.

A series of screws such as one shown at 73 will allow such attachment to occur. Importantly, more than one screw will be used for this purpose, so that the attachment of the plate 73 to plate 69 to be strong, sturdy as well as being adjustable, new holes may be made, so that the position of the plate 71 can be higher or lower or also can be toward the right side or the left side of the plate 69. The plate 72 is the horizontal piece, which may have a L shaped vertical wall 75 attached to it on an adjustable fashion. The function of the vertical wall 75 is for preventing the compartment from falling off the floor 72 of this attachment unit. The piece 75 is an adjustable L-shaped piece by itself. A vertical hinge means shown schematically at number 74, will attach to the body of the compartment and also to the body of the vertical wall 71 in order to allow the compartment to be rotated toward or away from the rear wall of the vehicle, in order to allow access to the trunk or back of the vehicle to occur.

Figures 25, 26:
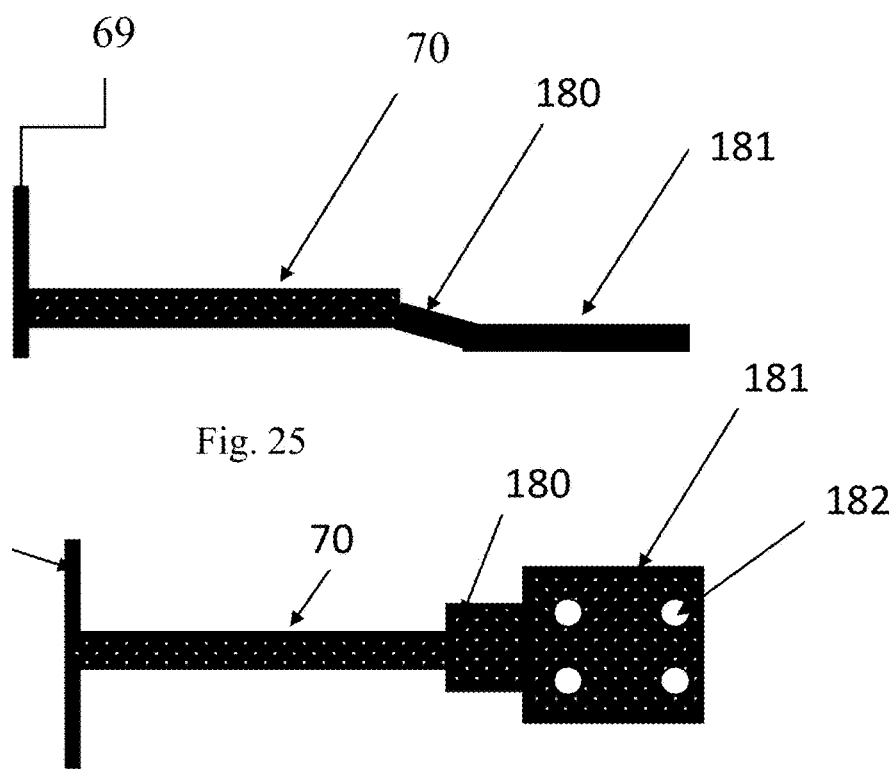

The top of the vertical wall 69 is attached to a flexible, resilient, strap means 77 at line 78. This strap means is made from a flexible, resilient material which has a second end piece 79 is designed for allowing the piece 79 to be attached to the floor, or wall/s of the trunk or by use of a series of attachment means to its body by use of screws or other strong attachment means so that it will prevent the resilient piece 77 from being separated from the attached area. By design, the piece 77 will have an adjustable or fixed means in order to prevent from the piece 78 to be pulled away from the rear of the vehicle. Thus the plate 69 has 2 attachments to the car, $1^{st}$ by the carrier shown at 70 and $2^{nd}$ by the resilient band of 77, thus the walls 69 will be securely attached to the vehicle, so that the detachment of this wall will not occur in a normal use. Also importantly, the plate 69 has holes 90, better shown on FIG. 14, which allows screws to go through the holes present in the license plate of the vehicle or similar for attaching the piece 69 to the rear wall of the vehicle for stronger attachment to the vehicle. In this Fig. the rear view of the strap means 77 and its end piece 79 are also shown. Also the cross cut of the pole 70 is shown with its rectangular shape. Importantly, the free end of the pole may be modified to be a horizontal shape plate so that it can be directly attached to the lower surface of the rear of the vehicle the same day which the commonly used hinges are attached. This model is shown in FIG. 25.

FIG. 13. Shows schematically the rear view of the attachment means 69-70 and its attached pieces such as strap means 77 and end means 79. This Fig. shows the rectangular shape of the piece 69 which has many holes one shown at 90 in it. Also shows that the strap means 77 has holes of its own one shown at 91 in order to allow it to be attached to the body of the car. The crosscut of the pole 70 is also shown.

FIG. 14. Shows schematically the front view of the attachment means 69 which has a rectangular shape with many holes one shown at 90 in it.

FIG. 15. Shows schematically the front view of the L-shaped, carrier shown in FIG. 12. This Fig. shows the rectangular shape of the metal plate 71 and the horizontal plate 72. The vertical plate has a vertical openings one of them shown at 92 which allows screws to go through and attach to the piece 69 on an adjustable fashion. The horizontal plate 72 has an L shaped piece 75 attached to it with its vertical wall shown at 75. The side view of these pieces is shown in FIG. 12.

Figure 16:
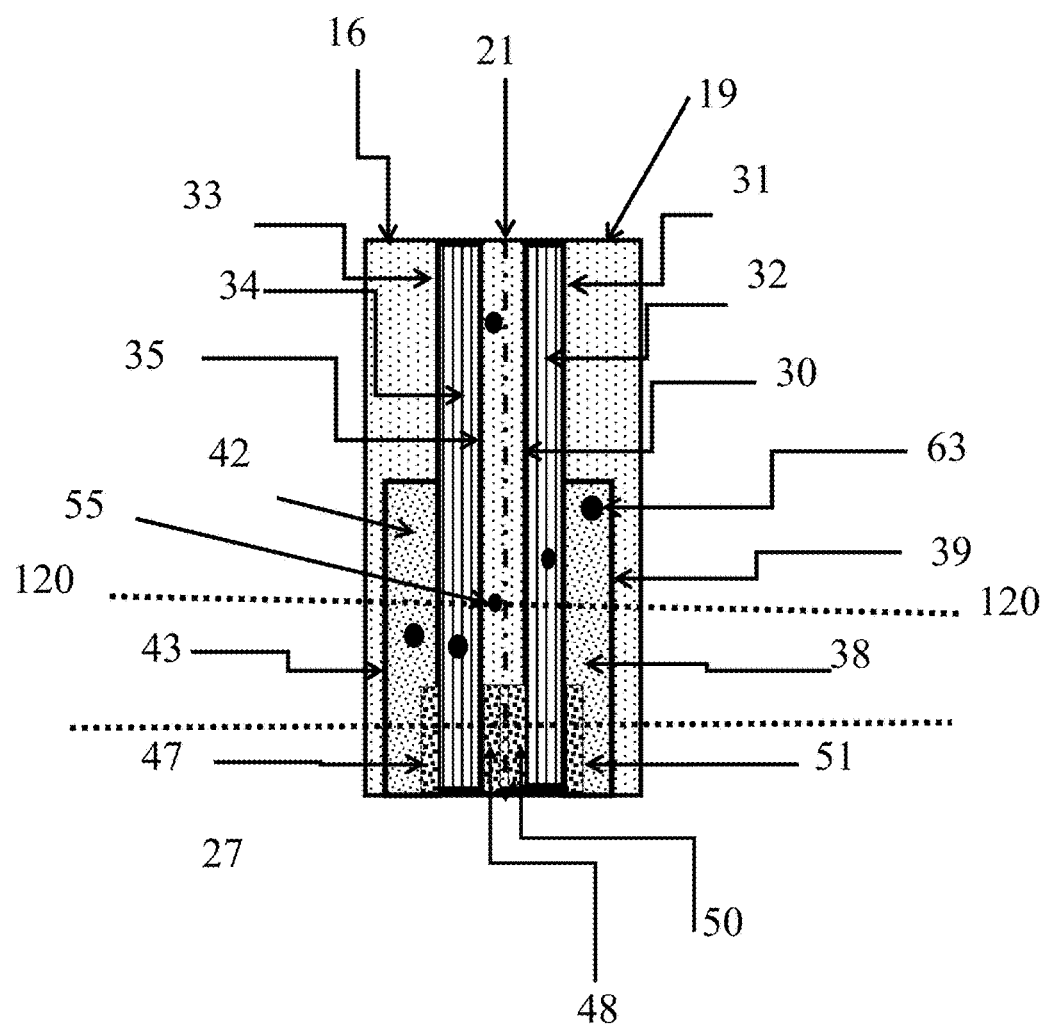

FIG. 16. Shows schematically the top view of the floor of a compartment which its floor is modified by having channels created by vertical walls. Importantly note this model does not have the ramp. This floor is made of two attaching sheets of metal shown 16 and 19 in FIG. 7 which are overlapping and the line of overlap is shown at 21 these pieces are screwed to each other for making a single functional carrier. The top view of such sheets is shown on FIG. 6.

In the upper right side of this Fig. note two vertical walls 30 and 31 which create channel 32. So that the front wheel of a object can be placed inside and be pushed forward till end of this channel. In the left side of the Fig. a similar and a mirror image of the channel 32, is shown at 34 created by the walls 33 and 35. So that when the front, left, wheel of the object is placed inside the channel 34 of the floor of the compartment it will move all the way to the end. Importantly also note the presence of a vertical wall 39 which has created the channel 38 in combination with the wall 31. In the left side of the lower part of this Fig. the parallel channel 42 is created by combination of the vertical wall 43 and the wall 33 from the channel 34.

The channels 38 and 42 are made for accepting the large rear wheels of the object to move into. The lowest part of this Fig. shows four small rectangular areas marked at 47, 48, 50 and 51 which are very similar to the oblique walls (wings) shown in previous FIG. 7 for the door/ramp piece. These four pieces are attached to the vertical walls of the lower end of the floor, and they will function to facilitate the entrance of the small front wheels of the object to channels 32 and 34. Since when the small wheels come from a vertical up to down direction they will touch the oblique walls and slide for entering the channels 34 and 32 with ease. These are shown better in FIG. 9.

FIG. 17. Shows schematically a cross cut view of the carrier shown at FIG. 16 across the dotted line 120. This piece is the floor of the compartment. In this Fig. a screw goes through the sheet 16, then the sheet 19 holding these two sheets of metal together securely, allowing the width of this piece to be adjusted. Importantly, a similar method can be used to allow the walls of this piece also to be adjusted. In this Fig., the sheet of the metal in the left side, is shown at 16 and for the right side, is shown at 19. The screw goes through the sheet 16 through the sheet 19 and holds them together. In the left side of this Fig. three vertical walls, 35 and 33 and 43, the vertical walls, 35 and 33 create the channel 34 for allowing the small front wheel of the object to be inside and move front and back along this channel. The vertical wall 43 works in combination with the vertical wall 33 for making the channel 42, allowing the large rear wheel of the object in the left side to roll along this channel 42.

Please note that the other side of this floor has the mirror image of the same walls explained in this Fig., and they create two channels; the first channel 32 for allowing the small front wheel to move along, and the second channel 38 for allowing the larger rear wheel of the object to move through.

FIG. 18. In coordination with FIG. 19 Shows schematically the lateral view of the floor of a modified compartment means shown as FIGS. 1 and 3 which is also designed for carrying a wheeled object such as a wheelchair and also uses channels for accepting and giving ride to the wheels of the wheelchair for moving inside the compartment easily. But in this version the channels are also made with the same depths, shape and distances for accepting the wheels of the wheelchair except instead of the walls of the channels being above the floor of the compartments these walls of the channels are located below the surface the horizontal floor of the compartment.

The applicant believes this change is very important since it has the advantage of making the height of the carrier smaller and the distance between the floor of this compartment and the ground level to be shorter. Therefore, the placement of the incoming object such as the wheelchair inside these channels or in this case, the wheelchair to be noticeably easier. The side view of this carrier shown is in FIG. 19 is also being used for understanding this model. In FIG. 18 the floor of the compartment means is shown at 93 and one vertical wall is shown which is vertically lower than the floor 93 of the compartment. The front end of the lower wall is shown at 94 and the rear end of it, is shown at 95. Optional curved, depressed areas are shown at numbers 97 and 96. The first depressed curved area 96 is designed for accepting and matching the outer curvature of the small front wheel of the object. The second depressed, curved area 97 is designed for accepting and matching the outer curvature of the large rear wheel of the object and keeping it from moving to a great degree. Importantly this Fig. shows schematically the presence of a third depressed, curved area 98 which is designed for accepting a matching the outer curve of the small front wheel of the object and keeping it from moving to a great degree as well. This Fig. also shows the side view of oblique rectangular walls shown at 99 in this Fig. and also in FIG. 19. Please note the function of the circular space 98 is very crucial and it is designed to combine with use of the oblique walls 99 and 100 shown in FIG. 18. for allowing the front wheel of the object to drop inside the channel 96 in a vertical move. Importantly, in this process the center axel of the rear wheel of the object plays a very critical role as well which would be explained.

FIG. 19. Shows schematically the cross cut view of the floor of a modified compartment means shown in FIG. 18. Along the line 250. This Fig. shows the horizontal floor of the compartment at 93 and a vertical wall 94 is vertically moved lower than the floor 93 of the compartment and with a matching vertical wall below the floor 93 create a channel by using the horizontal short wall 97. Another however not as deep channel is shown at 96 for accepting the smaller front wheel object. Similar but mirror image channels 101 and 102 are also made for use by the right-side smaller and larger wheels of the object. Importantly, this carrier has four oblique walls in the sides of the channel 96 and 101 for allowing the small front wheels of the object to hit these sides coming vertically in up to down direction and fall inside the channels 96 and 101 with ease. These walls are shown at 99, 100, 103 and 118 respectively.

Figure 20:
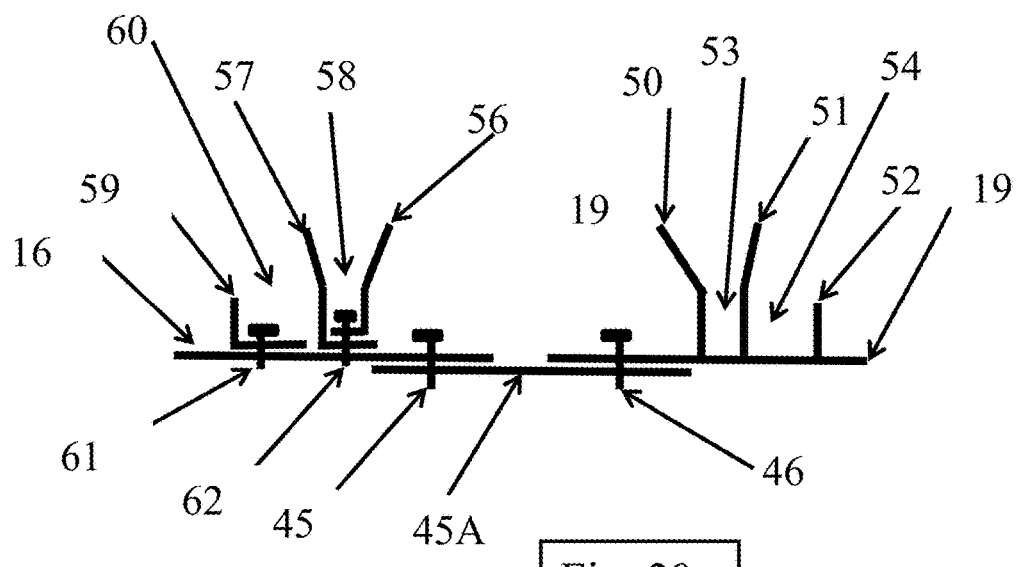

FIG. 20. Shows schematically the cross cut view of a carrier similar to the carrier shown in FIG. 9 except in this model the carrier is made from combination of multiple pieces attached to each other for allowing the distances of different pieces from each other to be adjusted in order to allow different objects with different distances between its wheels to be utilized. For example the screw 61 allows the position of the vertical wall 59 to be changed and the screw 58 allows the position of the walls 57 and 56 to be modified compared to the vertical wall 59 and also from each other. Also importantly the screws 45 and 46 allow the width of the whole floor carrier to be adjusted so that the carrier can be wider or narrower. Thus these options allow significant freedom in adjusting the position of these important elements in order to let the carrier to be used with a object which has different parameters when it comes to the positions of its wheels. Since the distances between wheels of a given object may vary.

Figure 21:
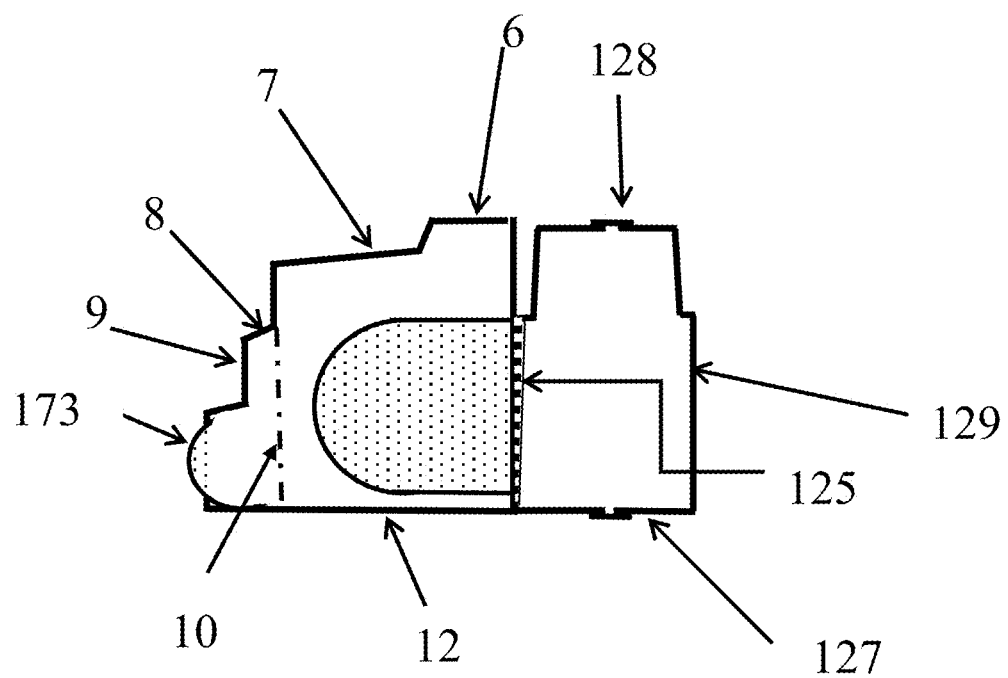
Figure 22:
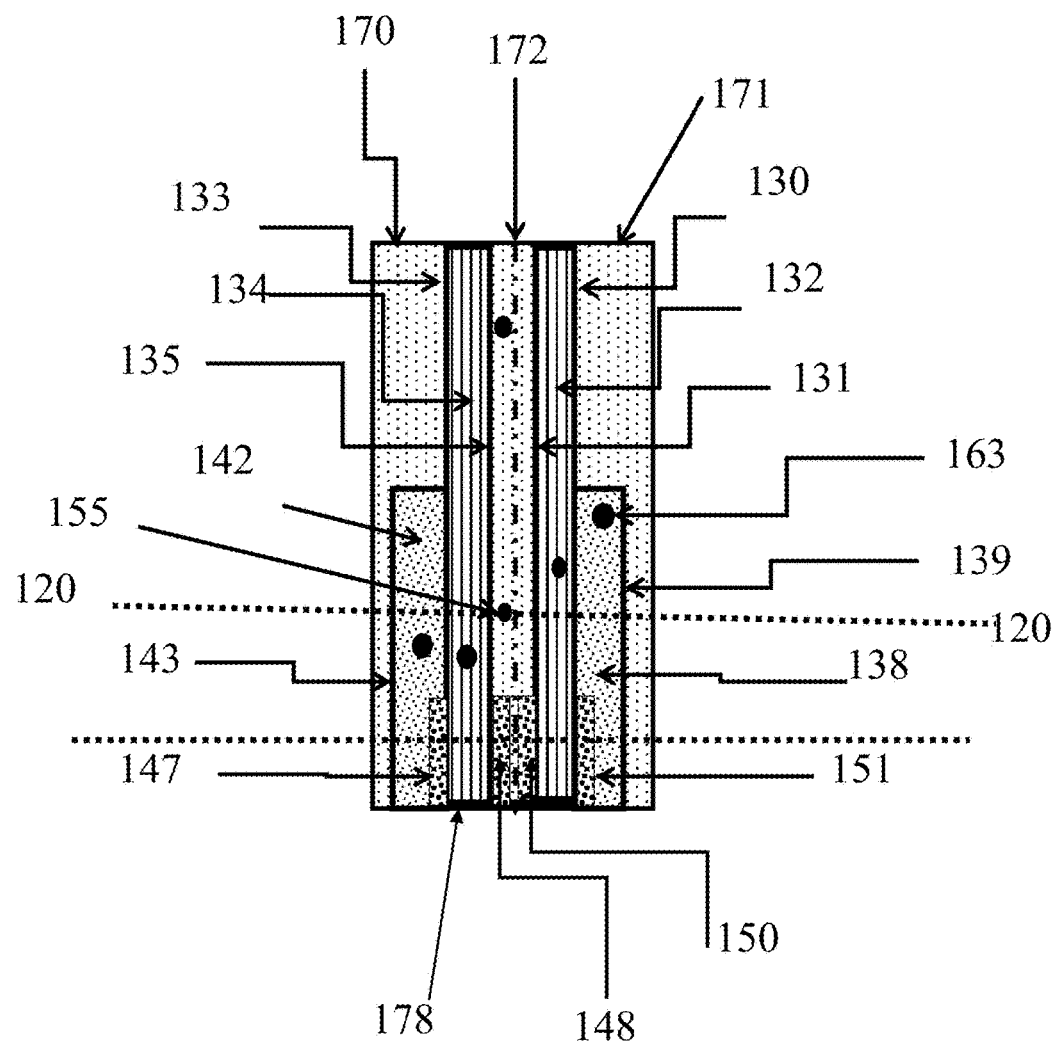

FIG. 21. Shows schematically the side view of a modified compartment means which is similar to the models s shown at FIGS. 3, 4 and 5. Except in this model the carrier does not have a ramp and instead the floor of a compartment is modified by having the channels and oblique walls as shown in FIGS. 16, 9 and 22 so that it allows the object to be inserted inside this compartment easily by using the steps similar to one explained in the text later. In this Fig. the body of the compartment is shown on the left side and it has a sidewall shown by its perimeters at 127, 128 and 129 which will be basically a flat or a shaped door means made from combination of sheets of metal/plastics and is hinged to the rear wall of the compartment by a hinge shown at 125. This door may be hinged to the other walls of the compartment such as the front wall, the floor or the top wall but attachment to rear wall or front wall would be easier and preferred. The door may be made from combination of one sheet or more for the adjustment of this piece both vertically or horizontally. And it can be made from combination of pieces one upper piece and one lower piece so that the first one can be closed first and the second one can be closed second. These doors would have lock means for allowing them to be locked on the body of the compartment.

FIG. 22. Shows schematically the top view of a floor means for use with a compartment such as one shown in FIG. 21 in which the compartment is modified in the manner which it does not have the ramp so that the incoming object can be directly entered inside the compartment by use of the new method of placement of the object inside the compartment floor by use of a floor consisting of the channels as well as oblique walls shown in its lower end as shown in this Fig. and in FIG. 23. This model will be very useful for vehicles such as some sedans which the rear end or part of the lower parts of the vehicle is much closer to ground than the SUVs. Therefore since the height of the rear part is low the need for the ramp may be eliminated for many users and this will allow for the creation of a compartment means without ramp means. This Fig. is very similar to the upper half of the model shown in FIG. 7 except the main difference is that the lower end of this floor means is the floor of the compartment and it has the same makeup in its lower end as shown in the FIG. 7. The floor of such a compartment may be made from a single piece or combination of two separate sheets of metal as shown at 170 and 171 which are overlapping and the line of overlap is shown at 172. These pieces are screwed to each other for making a single functional carrier. In the upper right side of this Fig. note two parallel vertical walls 130 and 131 for creating the channel 132. So that the front wheel of a object can be placed inside and be pushed forward till the end of this channel, which will be very close to the front wall of the compartment. In the left side of this Fig. a similar and a mirror image of the channel 132, is shown at 134 created by the walls 133 and 135 so that when the front, left, wheel of the object is placed inside the channel 134 the front left wheel will move all the way to the end. Importantly also note the presence of a vertical wall 139 in the right side of this Fig. which creates the channel 138 in combination with the wall 130. In the left side of the lower part of this Fig. the parallel channel 142 is created by combination of the vertical wall 143 and the wall 133 from the channel 134.

The channels 138 and 142 are designed for accepting the large rear wheels of the object for moving inside and going forward. The lowest part of this Fig. shows four small rectangular areas marked at 147, 148, 150 and 151 which are very similar to the oblique walls shown in previous FIG. 7 for the door/ramp piece. These four pieces are attached to the vertical walls of the lower end of the floor, and they will function to facilitate the entrance of the small front wheels of the objects to channels 132 and 134. Because by using a method which this applicant introduces in this application for the placement of the object inside the compartment the small front wheels come in a vertical direction from up to down to enter the channels 132 and 134 therefore these oblique walls (wings) will allow the front wheels to touch the oblique walls and slide down to enter inside the channels 132 and 134 with ease. These are similar to model shown better in FIGS. 9, 10 and 19.

This figure also shows the block means 178 in the left side and similar in the right side (which is not marked to prevent from a crowded figure). This is a vertical wall which is shown better in FIG. 23 and is intended to prevent from the small front wheels moving backward toward the user and falling from the channels. This is very important and by preventing from the small wheels from the fall it will make this carrier functional, usable and the stable.

Importantly, in some models the walls 139 and 143 may be eliminated instead to use the sidewalls of the compartment for preventing the large wheels to move sidewise. It should be noted that the third wheel of the object in each side which is shown at number 191 in FIG. 29 and is designed for manipulation of the movement of the object is the most lateral part and it will be approximate to the sidewall of the compartment and will prevent from the outside movement of the large wheels of the object, when it is placed inside the compartment.

Figure 23:
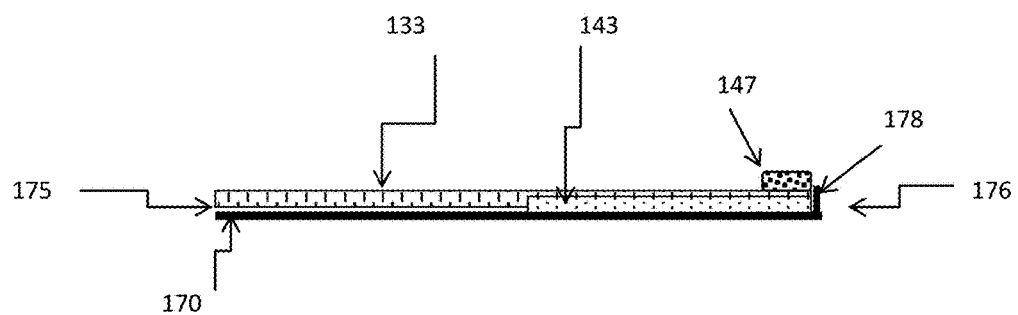

FIG. 23. Shows schematically the side view of the floor of the compartment shown in FIG. 21 and FIG. 22. This Fig. is similar to some portions of the FIG. 11 since these carriers are very similar. In this Fig. the floor of the compartment is shown at 170, the sidewall 143 is shown as well as the side of the wall 133. The front of this floor is shown at 175 and the rear end of it is shown at 176 the side view of the oblique wall 147 is shown. Also this Fig. shows the position of the vertical block at 178 which will prevent from the front wheel from moving backward and falling to floor from the channels 132 on 134. This vertical wall can be removed, the side view of this piece is shown at FIG. 24.

Figure 24:

FIG. 24. Shows schematically the rear view of the block means shown at 178 which is a rectangular piece this piece will be vertically inserted or attached to the lower ends of channels 132 and 134 from FIG. 22. Or it will be used as piece 49 shown in FIG. 7 to block the end of the channels 26 and 29.

FIG. 25. Shows schematically the side view of a connection means designed for allowing the rear wall of the compartment to attach to the vehicle directly or by use of an L shaped carrier 71, 72 shown in FIGS. 12 and 15. This carrier comprises of a horizontal pole shown at 70 which attaches to a vertical plate 69 shown at FIG. 12 as well. This carrier also has a shaped plate and parts shown at 180 and 181. The shape and configuration and the design of the piece

180-181 will allow this part to be similar to the end of commonly used hitches which can be attached to the lower, rear surface of the vehicles for towing boats or similar. Thus the piece 181 will be flat piece that can be screwed under the vehicle in the area which is designed for such use.

FIG. 26. Shows schematically the top view of the connection means shown in previous FIG. 25 and is designed for allowing a direct connection of the pole 70 to the rear lower surface of an vehicle. In this Fig. the horizontal pole is shown at 70 which attaches to the vertical plate 69 and the shaped pieces which are like plates made from a resilient metal sheets shown at 180 and 181. The piece 181 has perforations one of them shown at 182 which allow the screws to go through for attaching this piece to the rear lower surface of the vehicle. The shape and configuration and the design of the piece 180-181 will allow these pieces to be similar to the end of commonly used hitches so that it can be attached to the lower, rear surface of the vehicles for allowing them to tow the attached pieces such as the L shaped carrier from object means.

Figures 27, 28:
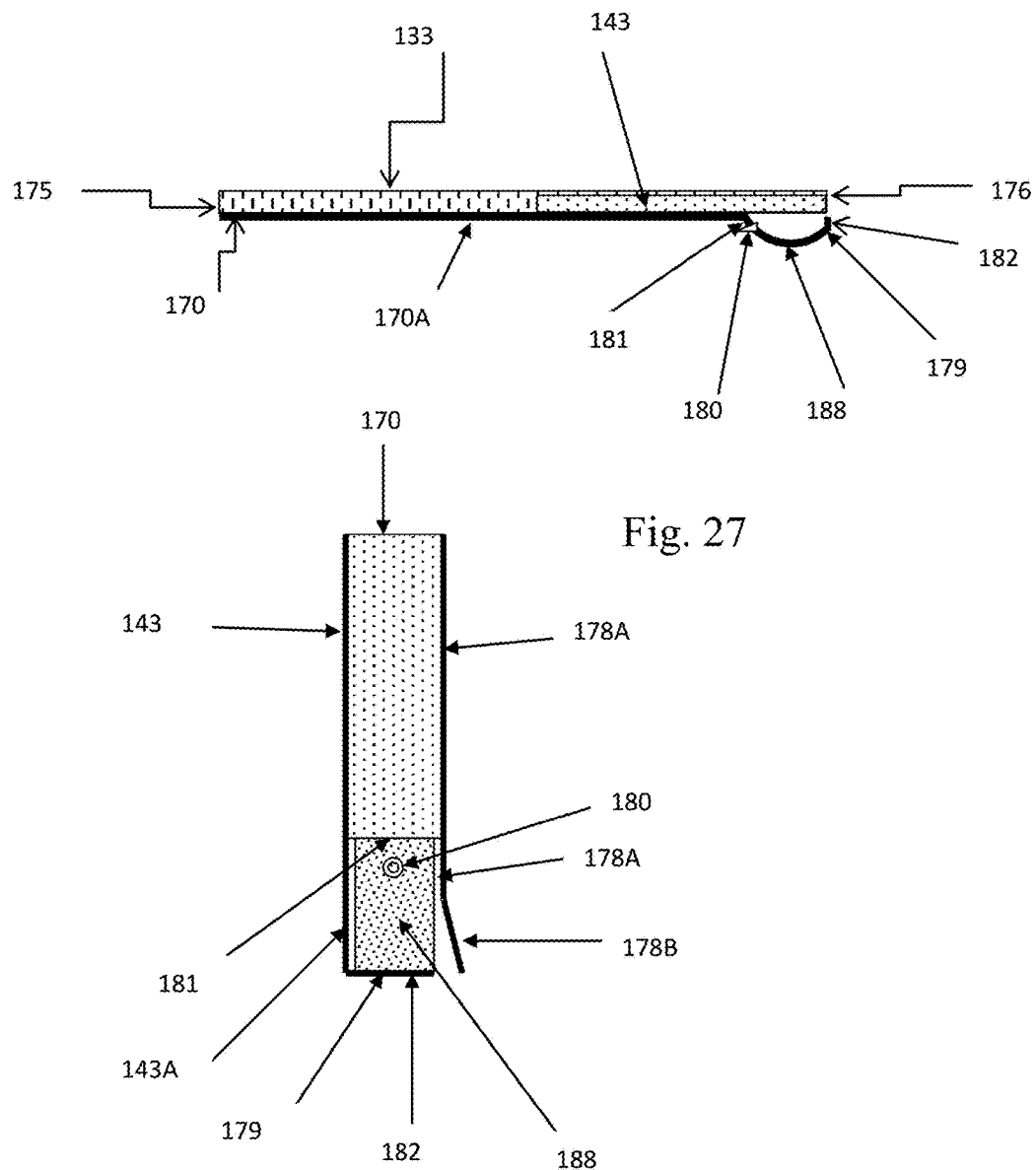

FIG. 27. Shows schematically the side view of a floor of a compartment shown in FIG. 23 except in this model there is a very important modification shown at the right side of this Fig. by curving the floor 170 downward at point 181 for creating the curved piece 188. Then the floor of the channel 188 will gradually moves up to point 179 and it ends with having the short vertical wall 182 which will function as a block. Also importantly this Fig. shows the presence of a light means 180 which will be powered by a battery and it allows this spot to glow and be seen easily in dark so that the user can easily identify the exact path which the front wheel should land. Please note that alternatively the upper surface of the area 188 may have a yellow colored reflecting cover which will shine due to the light from surrounding or a light similar to light 181 located on the ceiling of the compartment. In this Fig. the first/front of this floor is shown at 175 and the second/rear end of it is shown at 176 the side view of the vertical wall of the channel is shown at 133 and the side view of the vertical wall 143 is shown note in this model the oblique wall 147 is not shown and will be optional since they may not be as needed.

In an aspect, the advantage of this design is very significant since the sidewalls of the channel in the entrance allow the small front wheels of the object to move in from up to down direction and to sit in the curved area which has relative shape a spoon. In this position the sidewalls and the curved floor will secure and prevent the side movements of the front wheels while the spoon shape and their block will hold the front wheel in is secure position and will not allow the object to move backward.

At this point the object is very secure position: since the rear wheels are on the ground, the handles are in the hands of the user and the small wheels are secured in place. Thus at this point the user can lift the handles off the ground vertically and push the front wheel to move into the compartment this move and the handling of the object in this moment would be much easier because it will be similar to the handling of a wheel borrow since the front wheel will tolerate significant weight of the object. Thus the handling of the object and pushing it forward would need significantly lower amount of energy which would have been needed otherwise. Please note that at this movement of the front wheels inside the channels will be secure or and the user does not need to worry or use energy for preventing the lateral movements of the front wheels. Therefore the whole energy will be used in pushing the object forward. In a short time the front of the large wheels of the object will come in contact with the rear edge of the floor and by lifting the handles somewhat more the large wheels will start rotating and entering into their channels or designed path inside the compartment, then the continuation of moving the object inside the compartment will be very easy and it will be completed in short time and the next step will be securing the object and closing the door.

FIG. 28. Shows schematically the top view of a section of the floor of a compartment shown in FIG. 22. This figure shows the top view the section of floor 170 which curves downward at point 181 and creates a shorter curved floor 188. The floor 188 gradually moves up to line 179 and it ends with having the short wall 182 which will function as a block. Also importantly this Fig. shows the presence and the location of the light means 180 which will be powered by a battery and will glue brightly for allowing this spot to shine and to be seen very easily in dark so that the user can easily identify the path which the front wheel should land. This 188 may be also covered with a reflective material in order to glue with the intended color and direct the user easily. This color will be different for the similar zone which is planned for use by the larger wheel for a better identification.

In this Fig. the end of the vertical wall 178A bends for making the wall 178B so that the entrance to this channel will be facilitated by a wider opening and will ease the use of this carrier which is very important since it will ease the entrance of the front wheel of the object into the channel far more easier. Importantly please note that there is a gap between the lateral sides of the piece 188 and the sides of the vertical walls 143A, 178A, and 178B. This gap can be seen in FIG. 27 as well. Please note that alternatively the upper surface of the area 188 may have a yellow colored reflecting cover which will shine due to the reflection of the lights from the surrounding or a light similar to light 181 located on the ceiling of the compartment dissecting toward this surface. This lighting is very important parts of these new models and their importance in a dark street cannot be underestimated.

Figure 29:
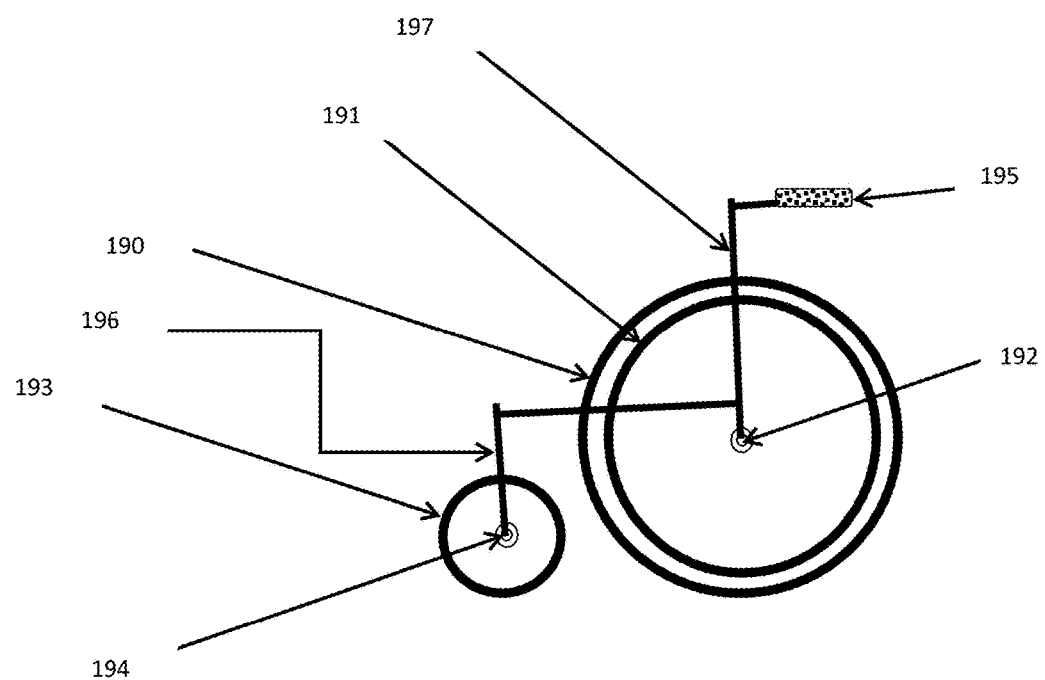

FIG. 29. Shows schematically the side view of a commonly used object consisting of two parallel small front wheels one shown at 193 which rotates along the horizontal axel 194 and two large wheels one shown at 190 which rotates around the horizontal axel 192 and a series of connection means which connects these wheels together. For example the vertical pole 196 attaches to the Axel 194 by help of connections and the vertical pole 197 attaches to axel 192 by connected pieces. A commonly used round propelling circular handle shown at 191 allows the person sitting on this object to move the object back and forth and rotate. A handle means shown at 195 allows the object to be pushed forward and backward.

Figure 30:
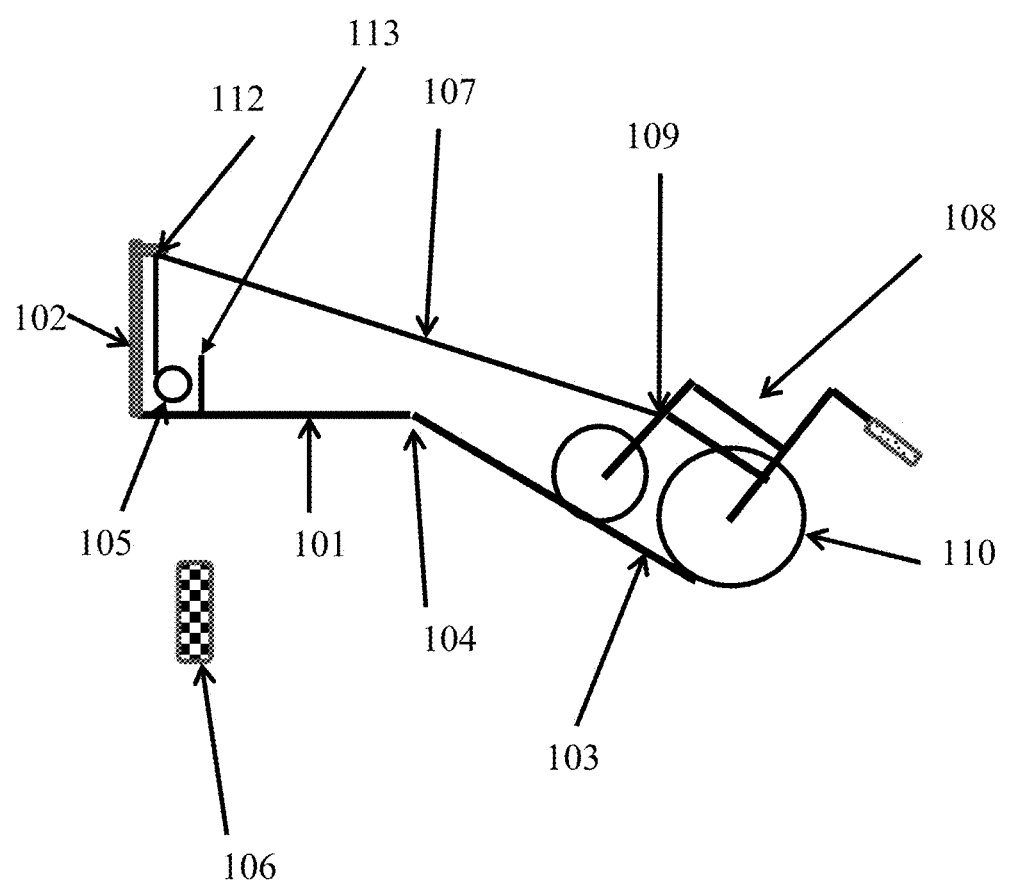

FIG. 30. Shows schematically a motorized means which allows a object and similar to be pulled inside the compartment. In this Fig. the floor of the compartment is shown schematically at 101 which is attached to the front wall of the compartment shown at 102 and also is hinged to the ramp 103 of the compartment by hinge 104. Object shown at 108 is attached at 109 to a resilient rope 107 which rolls around a small round wheel 112 for moving down and being winded around the electrical winch 105. A remote control 106 allows the function of the winch 105 to be controlled, with a contra clockwise rotation the winch will pull the rope 107 and move the object to the ramp 103 and finally to the floor 101. An electrical switch 113 will stop the winch when the front wheels of the object hits this switch. A clockwise rotation of the winch will release the rope 107 and the object can be pulled to move to the ramp 103 and finally to the ground by a slight pulling and force of gravity. Other devices such as Electrical Jacks can be attached to elevate the compartment from the ground to a moving position also other designs may be used for such purposes.

Figure 31:
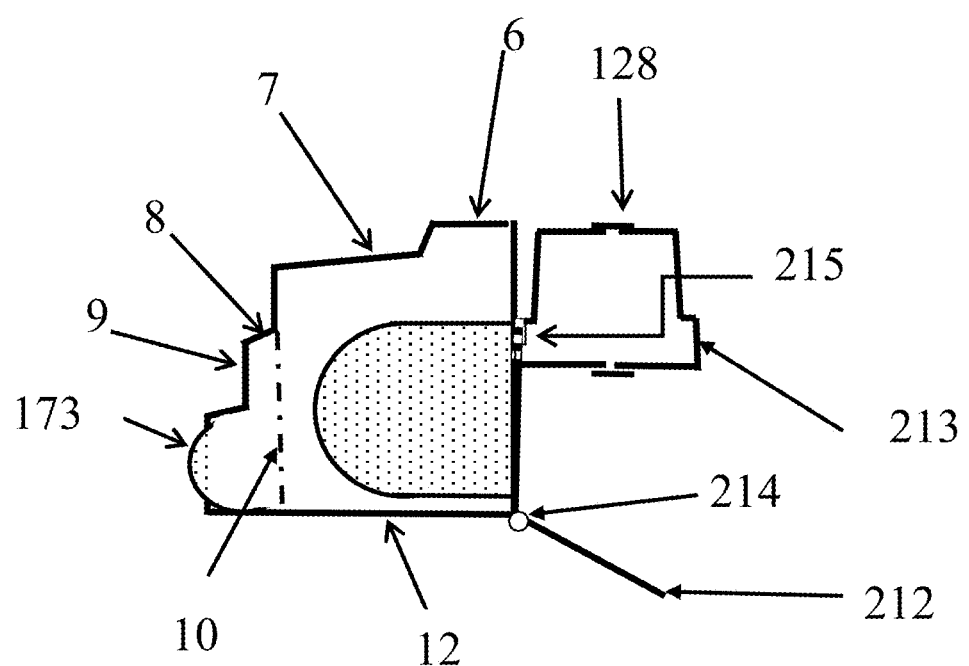

FIG. 31. shows schematically the side view of a compartment means of the carrier comprising:

A. A compartment shown on the left side which has an almost half-sized rear wall (half door) shown at 213 which is hinged to the rear wall of the compartment by a vertical hinge 215.

B. It has another almost half door shown at 212 which is hinged to the lower right end of the floor of the compartment by a horizontal hinge shown at number 214 and is designed for functioning as a half ramp similar to the model shown at FIG. 32. The advantage of this model is that it can be helpful for users who do not need to have the whole ramp all the way down and they can use the method explained in this application which allows the object to be loaded on the ramp with ease.

Figure 32:
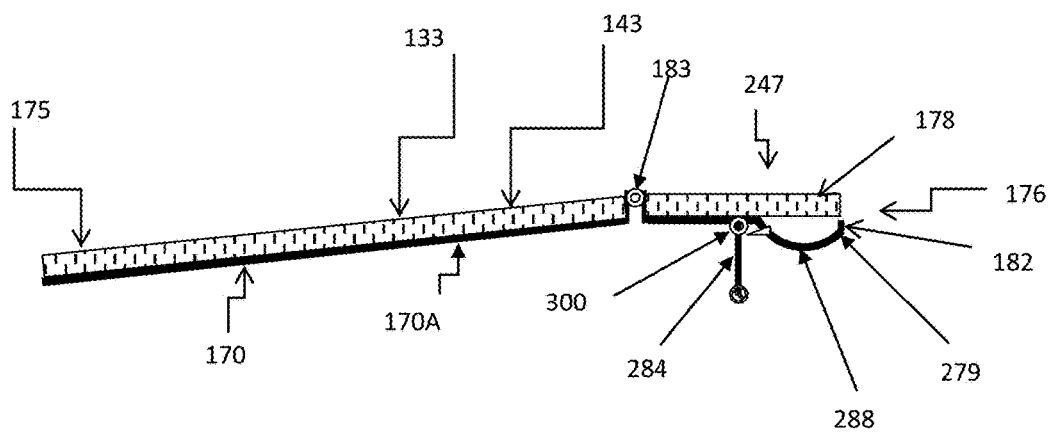

FIG. 32. shows schematically the side view of a floor of the compartment shown in FIG. 27 except it shows a very important modification shown at the right side of this Fig. by having the floor 170 and a half rear door/ramp shown in the right side at 247 which is hinged to the floor of the compartment by hinge 183. The floor of this part is very similar to the model shown at 27. It has a vertical wall 178 which is the wall of the channel. However the floor of this segment curves down and creates the curved piece 288. Then the floor of the channel 288 will gradually moves up to point 279 and it ends with having the short wall 282 which will function as a block. This Fig. also shows the light means. Please note that alternatively the upper surface of the area 288 may have a yellow colored reflecting cover which will shine due to the light from surrounding or a light on the ceiling of the compartment. Also this Fig. shows the adjustable pole 284 hinged to the floor of the ramp by hinge 300. Note the front of this floor in the left side and is the floor of the compartment, which here has a slow to make the object to enter the compartment with ease.

Figure 33:
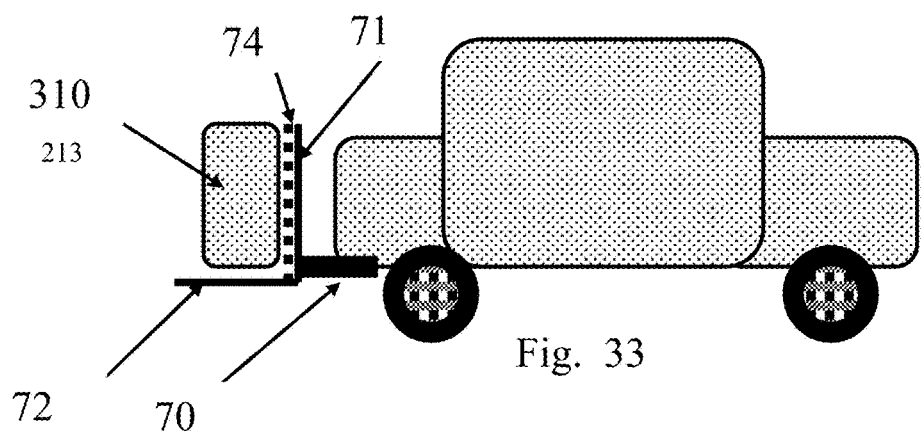
Figure 34:
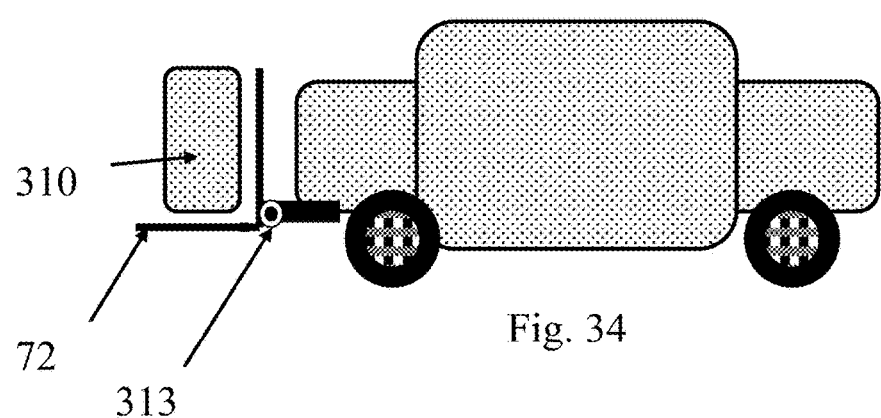
Figure 36:
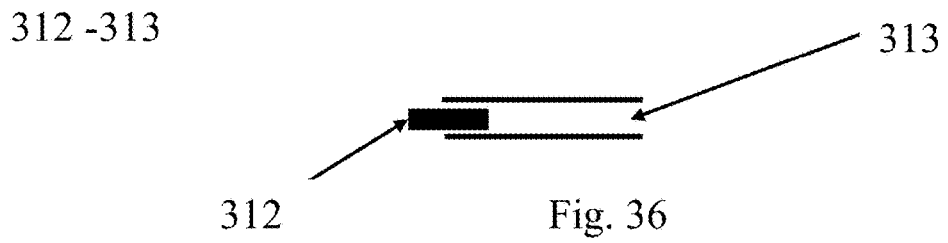

FIGS. 33, 34 and 36 are chosen to collectively show the methods which can be used in order to move the compartment from the trunk of the in order to access the trunk.

FIG. 33. Shows schematically a compartment 310 which is attached to an L-shaped means shown at 71-72 by use of the vertical hinge 74. The L-shaped carrier is attached it to the rear lower part of the vehicle by use of means that 70. In this model the user is able to rotate the compartment 310 laterally by use of the hinge 74 in order to access the trunk. A lock means of various kinds may be used in order to keep this compartment attached to either the means 71 or body of the vehicle to prevent it from moving.

FIG. 34. Shows schematically a compartment 310 which is attached to an L-shaped means shown at 72 as shown in previous figure. This L-shaped means is attached to the means of an attachment to the vehicle by use of a horizontal hinge 313. The hinge 313 allows the compartment 310 to rotate along this horizontal hinge and get away from the trunk of the vehicle in order to allow the trunk to be accessed. In this model also a lock means of various kinds may be used in order to prevent from the compartment from moving.

Figure 35:
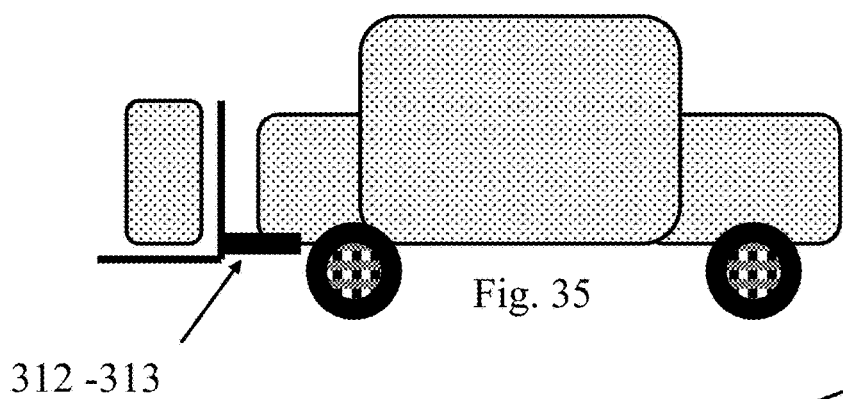

FIG. 35. Shows schematically a compartment 310 which is attached to an L-shaped means and is attached to the rear means of vehicle by the carrier shown at 312-313 which is shown in more details at FIG. 36. The means 312-313 is made from combination of two means A. An outer the strong enclosure 313 which allows an insert 312 to move in and out. B. An inner part 312 is attached to the L shaped from first end and the second end moves inside the enclosure 313. The outer enclosure 313 is attached to the rear of the vehicle from one end and accepts the inserted 312 from the other end. Therefore when intended the H shaped carrier can be moved out to allow the access for the trunk to occur. Then it can be pushed toward the vehicle and locked for transport.

Figure 37:
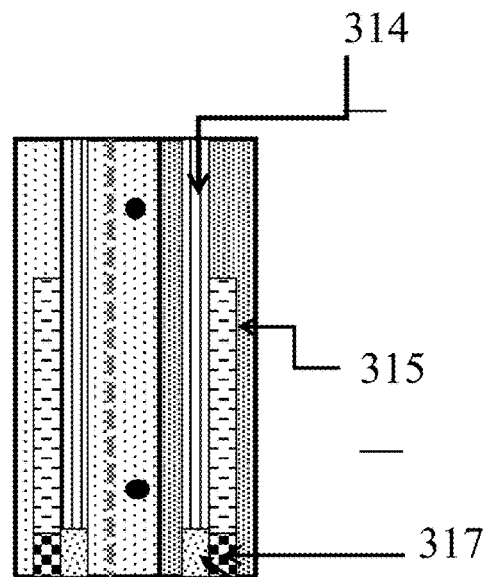

FIG. 37. Shows the floor of a compartment which consists of two pieces attached to each other similar to the carrier shown on FIG. 6. Except this figure also shows the presence of four channels on its top which are designed for the wheels of the object to move in. In this figure the channel 314 is designed for accepting the small front wheel of the object and attached to it the channel 315 is shown which will accept the right large wheels of the object. In the lower end of these channels there are zones one of them shown in the right side at number 316 and another one is shown at 317. A similar but mirror image channels are present in the left side as well. The zone shown at 316 is covered by a light reflective means with a color such as yellow and will reflect a yellowish light in order to inform the user. The area shown at 317 has similar reflective surface except with different color for example blue to inform the user that the large wheels in the right side are to move on top of this zone. Please note that although these zones are shown to be flat but they may be made to have a three-dimensional makeup with the changes shown in FIGS. 27 and 28. And these zones to move down for making the spoon shaped area for accepting the wheel.

Figure 38:
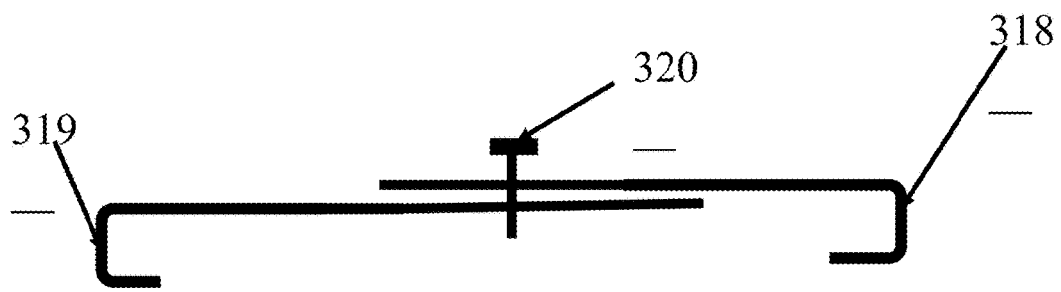
FIG. 38 shows a gadget designed for holding the vertical parts of the wheelchair's in a desired distance.

FIG. 38 shows schematically a special gadget designed for holding the vertical parts of the object shown in FIG. 29 at 196 and it's a mirror image counterpart (not shown in FIG. 29) also part 197 and its mirror image counterpart (again not shown in FIG. 29) together in a fixed predesigned position for the purpose of placing the object inside the compartment. So that in a folded condition the distance between these two parts of the object would be fixed. This is because the wheels of the object are attached to these parts: the smaller front wheel 193 is attached to the vertical part 196 and the larger rear wheel 190 is attached to the vertical part 197 or the horizontal part of the handle 195. Therefore using this gadget will keep the wheels of the object in stable and controlled distances. Having fixed and controlled distances of the wheels from each other is a very important and critical issue for the whole system to work since it will allow the front and the rear wheels to have the desired distances needed for entering the channels shown in previous figures such as FIG. 22 and similar and move forward and backward, since in a given model of the compartment the distances of the channels from each other is fixed for use and the distance of the wheels has to match those distances of the channels for the system to work.

In an aspect, without such a gadget or a similar control means of various kinds the distances of the wheels of the object may not be the needed distance for entering the channels, therefore they will not fit the channels and using them would be very difficult. At the time of use the cane shape ends of the gadget shown at 318 and 319 will be positioned to hold the vertical piece 196 and its counterpart in the other side. The desired distance of the vertical parts can be decided based on tightening of the screw 320 which will allow the total length of the gadget to be decided.

Figure 39:
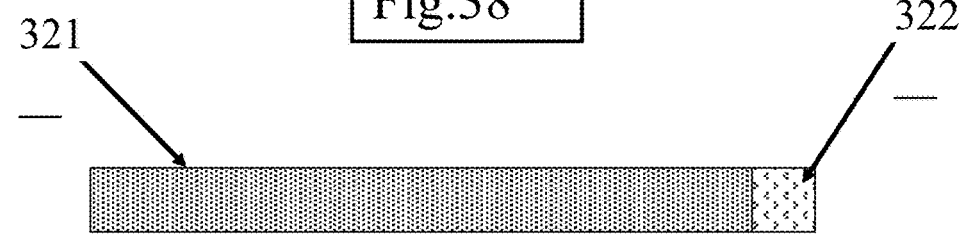
FIG. 39 shows a Velcro® strap with zones of loop and hook designed for holding the object's parts in desired distance.

In an aspect, when use of two of such gadgets will be used, one for the front part 196 and its counterpart and the second one will be used for holding the handle part or the piece 197 and its counterpart together. Please note that such a gadget may be modified so that one end of it could rotate around one part such as part 196 so that it would not fall. Also the piece 319 may be spring in order to engage and disengage from the related content part of the vertical pole 196. Alternatively a resilient piece of Velcro® tape may be used as shown in FIG. 39 in order to wrap around the two vertical parts 196 and 197 and their counterparts in the desired distance from each other. The applicant has used such a carrier successfully in his experiments. In this model shown at FIG. 39 the zone of Velcro® loop is shown at 321 and the zone of Velcro® hook is shown at 322 so that the Velcro® loop type part goes around the two vertical pieces and will hold them in the wanted distance by use of the Velcro® hook attached to Velcro® loop shown at 322.

Figure 40:
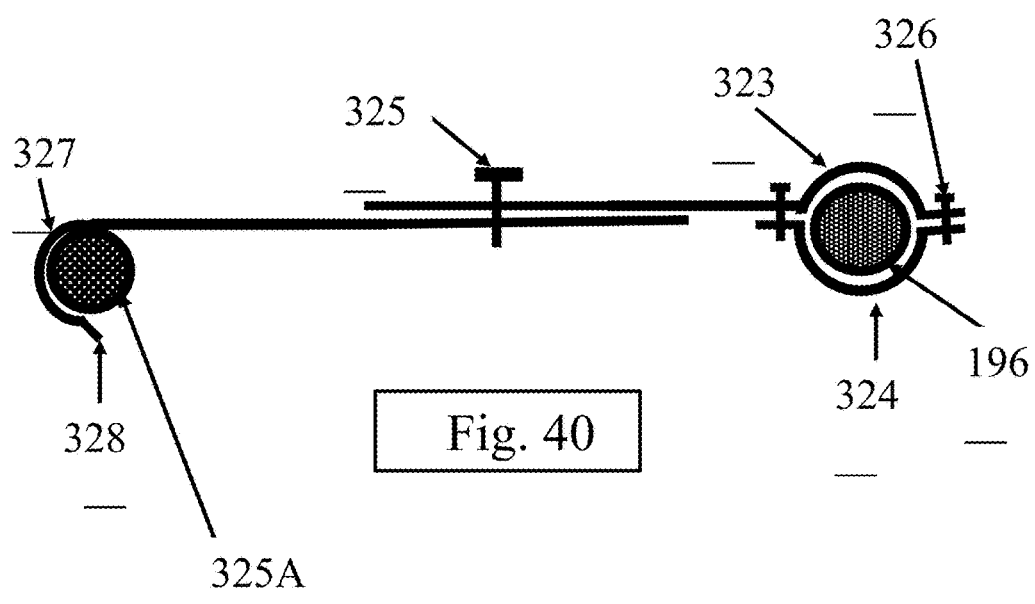
FIG. 40 shows a clamp means which moves around the vertical part of wheel chairs attached to the wheels.

FIG. 40 shows schematically a clamp means similar to one shown on FIG. 38 which the ends of this gadget is modified by allowing to have a circular construction made of two semicircular pieces shown at 323 and 324 which have extensions attached to each other by screws one shown on 326. This end is fixed around the vertical piece 196 from the object and can rotate around the vertical piece 196 from the lower front wheel. The other end has a spring means shown at 327 which has its end piece 328 allowing this a spring means to get engaged with the other vertical pole shown at 325A from the object and them securely. The distance of these two pieces can be modified by use of the screw means shows in the center at 325.

DETAILED EXPLANATION OF THIS INVENTION

The use of various wheeled objects such as strollers, scooters and similar has been very helpful in easing the human life. Commonly these objects are lifted and placed inside the vehicle or its trunk. However, lifting of such heavy objects with irregular shapes for placing them inside the vehicle or its trunk is difficult and labor intensive, particularly when the user has limited physical reserve and power. For this reason this applicant has introduced carriers to the USPTO for helping in this regard by using a compartment with a ramp for moving the carriers up and into the compartment. Through the years the applicant continued on his R&D for improving his original idea and introducing improvements, newer models and additions to his original invention for making the use of such carriers simpler, easier and quicker.

This invention considers the difficulty in directing and advancing the incoming object such as a stroller/wheelchair and similar into the carrier compartment and placing them inside the compartment, and introduces models of the carrier means which will make such use easier both with or without using ramps in these carrier means. In this application the use of channels or U shape and L shaped walls are stressed which helps in directing the wheels of the upcoming object such as a wheelchair, stroller and similar, much easier. In practice the incoming objects being pushed or moved up in a ramp or inside the compartment have the tendency for moving from side to side and making it difficult for the user to manipulate them. Thus the applicant is introducing more detailed adjustable vertical walls for being fixed on the ramp and/or inside the compartment for making groves/channels. Such design will make the wheels of the incoming objects to be directed inside these groves/channels for moving forward with ease. Also the applicant introduces ramps and the floor of the compartment with shaped objects and channels so that the wheels of the incoming objects can be easily placed and moved forward and backward with significant control. Also the position of the compartment compared to the cars is designed to be adjustable so that the compartment can be placed upper, lower, to right or to the left of the car in the most convenient place for use. The new methods allows these carrying means to be attached to the body of the cars with more than one means, shown in FIGS. 12, 13, 14 and 15 and related figures.

These new systems will allow the user to move a wheelchair or similar into the compartment in the rear of the car in a very short time and without significant energy expenditure. These objects continues the use of a compartment shown at FIGS. 1, 2, 3, 4 and 5 which will be attached to the rear of a vehicle by an adjustable attachment means shown at FIGS. 12, 13, 14 and 15. In one model introduced here the compartment shown at FIGS. 1 and 2 has a door means shown at 107 which opens and will be placed on the ground for functioning as a ramp. This ramp has a series of adjustable short vertical walls, shown at FIGS. 1, 2, 7, 8 and some other similar Figs. Which allow the creation of channels in the upper surface of this door/ramp in order to accept the wheels of the incoming object; so that the wheels will be moved in the right direction. The use of these channels are very important because they allow the control of the whole object to happen with preventing the incoming wheeled objects from moving side to side and being out of control. Importantly this application introduces a series of short oblique walls for the ramp shown at 47, 48, 50 and 51 in FIG. 7 also shown at FIG. 9 which are made from almost a rectangular relatively rigid piece of metal. These pieces are attached to the upper part to or the top of the vertical walls of the lower end of the door/ramp (the entrance) so that they create two oblique parallel walls which facilitate the entrance of the small front wheels of the object. So that the wheels will slide down when they touch these oblique walls and enter inside the channels 29 and 26 with ease. These small rectangular pieces 47, 48, 50 and 51 are shown better in FIG. 9. One may compare these to the crosscut of a funnel.

FIG. 9. Shows schematically the cross cut view of the lower part of the carrier shown at FIG. 7 (the door/the ramp) along the dotted line 116. This cut is for illustrating the more details of the small rectangular walls, 47, 48, 50, and 51. These rectangular oblique pieces attach to the vertical walls in the entrance and in this Fig. only the oblique pieces are marked for preventing a crowded Fig. Once more the importance of the vertical walls with oblique segments is that they will direct the small front wheels of the object when they are moving vertically from an up to down direction. The research of the applicant has shown that such function is very important since it prevents from the difficulty of an old or a weak person in inserting the front wheels of the object into a relatively narrow channels shown at 29 and 26 shown in FIGS. 7 and 8.

Importantly the applicant has created a method of placement of the smaller front wheels on the ramp or floor of their compartment by utilizing the axel 192 from FIG. 29 in the center of the large rear wheels as an important means for elevating and lowering of the smaller front wheels 193 shown at FIG. 29 of the object. In this method pressing the handles 195 from FIG. 29 of the object vertically down will raise the front small wheels 193 vertically upward, thus the energy needed for utilization of lifting effort would be much less and will allow even many elderly and weaker persons to be able to do that easily, by use of the following steps. Please note in this process two physics systems will be used:

A. Using the axel of the large wheels, allows pressing the handles down to raise the front wheels upward.

B. Using lever system. Pressing the handles will raise the front wheels with significant ease.

C. After the small wheels are in the channels, lifting the object by raising the handles will be far easier since the weight will be distributed to the small wheels, on the channels.

The steps:

Step 1: The user brings the front of the object close to the ramp of the compartment and let it stand while the front of the small wheels is tilted backward, by rotating along the pole 196.

Step 2: The user will push the handles 195 of the object down vertically for raising the front wheels 193 upward vertically.

Step 3: The user will push the object forward for locating the front wheels in a position right over the oblique walls 47, 48, 50 and 51. During this step the weight of the object is only on the rear wheels and the axel 192 allows the handles 195 to move down vertically for raising the small front wheels 193 upward vertically. This is a very critical issue, since it uses the rules of physics of the lever system.

Step 4: In this critical position the user will raise the handles of the object upward vertically so that the small front wheels would move down vertically and touch one of the oblique walls 47 or 48 in left side and 50 or 51 in the right side. Then the power of the gravity will make the smaller front wheels to fall vertically inside the channels 29 and 26 easily. At this moment the wheel chair will be stable and the user can rest for a moment or more.

Step 5: Having the front wheels on Channels 29 and 26 and the larger wheels on the ground the user will push the object forward till the front wheels will move along that channels 29 and 26 and the large wheels of the object would move forward for being close to the entrance edge of the ramp. In this position using the front wheels of the object as a weight tolerating means the user would be able to lift the rear wheels up and push forward until they enter into the channels 40 and 37 respectively.

Step 6: In this step the user will push the object forward a few more inches to reach its destination inside the compartment.

Importantly note that the research of the applicant has shown this method to be very easy, applicable and require far less energy from the user, since the weight of the object will be distributed and would need much less energy from the user, therefore this method is far more superior and advanced.

Importantly note that a removable vertical wall shown at 49 in FIG. 7 and in FIG. 11 will function as a block in preventing from the small wheels of the object from moving backward and falling from the channels 29 and 26. Similar block is shown at 178 FIGS. 22 and 23 as well as 182 at FIG. 27.

FIG. 11. Shows schematically the side view of the door/ramp similar to the lower half piece of a carrier similar to the carrier shown in FIG. 7. Except this Fig. shows a pole 66-68 designed for height control means which is attached to the lower surface of the door/ramp by a hinge 67 to allow the height of this pole and therefore the distance between the end of the wall/ramp 17 from the ground to be modified: increased or decreased. This is important and can play a role in allowing the user to choose the height of the beginning of the ramp to be decided also the slope of the ramp can be more or less depending on the height and body of the user. Please note although one method for such adjustment is shown in FIG. 11 however many other methods and means may be used to achieve this goal such as placing a block under the ramp or similar. The hinge 67 of this pole to be in a vertical position for standing on the ground and rotate due to gravity and be parallel to the body of the ramp when the ramp is closed and be attached to it by use of clamps. It can also be used as a handle for pulling the door/ramp to open.

Importantly: this application shows the following models for use:

A. A first model shown at FIGS. 1 and 2 and related FIGS. 3. 4, 7, 11, which has a compartment shown in the left of FIG. 1 as well as a door/ramp 107 which is hinged to the rear of the compartment and will open to be placed on the ground for being used as a ramp.

B. A second model shown at FIGS. 3. 4. and related FIGS. 21, 22. 23. In which the carrier has a compartment but does not have a door for being used as a ramp. Since the design provided in these models allows the object to be directly entered into the compartment using the steps mentioned without a need for a ramp. These two models are related but instinct from each other and each one is a very important and helpful carrier for certain group of users.

C. A third model that is shown at FIGS. 31 and 32 in which the carrier has a half ramp. The half ramp will be easier to use for some people and with using the method explained in text it will be significantly easy for use.

Importantly also this application shows means which allows they body of the compartment to be attached to the body of the automobiles by use of adjustable means. These adjustable means will allow one or more parts or pieces to be attached to the body of the automobile, for making a secure and adjustable connection. Use of a hinge means shown in FIGS. 12, 15, 33 and 34 allows the compartment to be rotated away from the back of the car for allowing access to the trunk or opening the rear door of the automobile when it is not moving. Also the compartment can be pulled out the way from the vehicle for accessing the trunk as shown in FIGS. 35 and 36. The compartment will be locked into position close to the rear of the automobile for being moved. New versions of attachment means are at FIGS. 12 to 15.

FIG. 12. Shows schematically the side view of an attachment means which allows the carrier means or the compartment to be attached to the rear of an automobile for being carried. This carrier consists of following pieces: a first vertical plate 69. This vertical plate has a horizontal metal pole shown at 70 which has a strong body with a rectangular crosscut and allows it to be inserted inside a commonly used hitch attachments means in the rear of the vehicles. After the connection of this plate 69 to an automobile then an L-shaped, sturdy carrier made from metal plates shown at 71 and 72 will be attached to the vertical plate 69 by means of screws. The L shaped carrier 71-72 allows the compartment to sit inside the horizontal plate 72 of this carrier for being carried out. The plate 72 is the horizontal piece, which may have an L shaped vertical wall 75 attached to it on an adjustable fashion. The function of the vertical wall 75 is for preventing the compartment from falling off the floor 72 of this attachment unit. The piece 75 is an adjustable L-shaped piece by itself. A vertical hinge means shown schematically at number 74, in this Fig. and also in FIG. 15 will attach to the body of the compartment and also to the body of the vertical wall 71 in order to allow the compartment to be rotated toward or away from the rear wall of the automobile, in order to allow access to the trunk or back of the automobile to occur.

The top edge of the vertical wall 69 is attached to a flexible, resilient, strap means 77 at edge 78. This strap means is made from a flexible, resilient material which has a second end piece 79 designed to allow the piece 79 to be attached to the floor, or wall/s of the trunk of the vehicle so that it will prevent the resilient piece 77 from being separated from the attachment area. By design, the piece 77 will have an adjustable or fixed means in order to prevent from the piece 78 to be pulled away from the rear of the automobile. Thus the plate 69 has 2 attachments to the car, 1st by the carrier shown at 70 and 2nd by the resilient strap 77, thus the walls 69 will be securely attached to the automobile, so that the detachment of this wall will not occur in a normal use. Also importantly, the plate 69 has holes 90, better shown on FIG. 14, which allows screws to go through and through holes present in the license plate of the car or similar to attach the piece 69 to the rear wall of the automobile. In this Fig., the rear view of the strap means 77 and its end piece 79 are also shown.

FIGS. 13. 14, and 15 Shows schematically the details of the connection means and are explained in details in related figures. FIGS. 25 and 26 also shows the details of a new attachment means to automobiles and are explained in details in those figures.xxx FIG. 16. Shows schematically the top view of the floor of a modified compartment means which is modified and simplified by not having a ramp. However its floor is modified by having the channels and also by having a lower end (point of entrance) which has the same means as shown for the lower end of the ramp means shown in FIGS. 7, 9 and 20. Thus the incoming object can be directly manipulated by using the special method explained in this text and entered inside the compartment without the need for using the ramp. Such a modified compartment is schematically shown in FIG. 21 FIG. 22. This floor is made of two attaching, overlapping sheets of metal as shown in FIG. 6 similar to the sheets shown at 16 and 19 in FIG. 7 which have a line of overlap shown at 21 these sheets are screwed to each other for making a single functional carrier. The top view of such sheets is shown on FIG. 6.

In the upper right side of this Fig. note two vertical walls 30 and 31 which create channel 32. So that the front wheel of a object can be placed inside this channel and be pushed forward till the end of this channel. In the left side of the Fig. a similar and a mirror image of the channel 32, is shown at 34 created by the walls 33 and 35. So that when the front, left, wheel of the object is placed inside the channel 34 of the floor of the compartment it will move all the way to the end. Importantly also note the presence of a vertical wall 39 which has created the channel 38 in combination with the wall 31. In the left side of the lower part of this Fig. a parallel channel 42 is created by combination of the vertical wall 43 and the wall 33 from the channel 34. The Channels 38 and 42 are made for accepting the large rear wheels of the object to move into. The lowest part of this Fig. shows four small rectangular walls marked at 47, 48, 50 and 51 which are very similar to the oblique walls shown in previous FIG. 7 for the door/ramp piece. These four pieces are attached to the vertical walls of the lower end of the floor, and they will function to facilitate the entrance of the small front wheels of the object to channels 32 and the 34. When the small wheels come from and up to down direction they will touch the oblique walls and slide to enter inside the channels 32 and 34 easily. The side views of these walls are shown better in FIG. 9. Thus this carrier is made from a modified single compartment and method of use is similar to the method explained earlier in the text.

FIG. 17. Shows schematically the cross cut view of the carrier shown at FIG. 16 across the dotted line shown at 120. Please note this is a piece which makes the floor of the compartment, and it is made from combination of two sheets. The vertical walls and their related channels are also shown. Importantly note that instead of the side walls 43 and 39 the sidewalls of the compartment may function as the walls 43 and 39 for constricting the larger object and its hand rails.

Before explaining the FIGS. 18 and 19 please note that importantly this application shows two versions of the channels for use on the ramp or on the floor of the compartment.

A. The first model is shown in FIGS. 7, 11, and the 17. Which in these models the vertical/perpendicular walls are erected above the floor of the compartment or the ramp.

B. The second model shown in FIGS. 18 and 19 in which the channels are created by having the walls vertically lower than the floor of the compartment and the ramp. This version has the advantage of reducing the height of the compartment and also modifies the shape of the channels as well. Importantly, note that in practice such models of the walls of the floor and ramp has to be similar and match for proper function. In other words, if the floor of the compartment has erected walls the door/the ramp should also have erected walls as well. And if the compartment has depressed walls the door/ramp also should have depressed walls as well. Even though mixing these formats with each other is possible and in some cases may be beneficial. Naturally in the models which the carrier does not have the ramp only the floor of the compartment has to have this optional model.

FIG. 18. In coordination with FIG. 19 shows schematically the lateral view of the floor of a modified compartment means shown as FIGS. 1 and 3 except in this version the channels are made with the same depths, shape and distances for accepting the wheels of the object except instead of the walls of the channels being above the floor of the compartments these walls of the channels are located bellow/inferior to the surface the horizontal floor of the compartment. Thus the height of the carrier will be smaller and the distance between the floor of this compartment and the ground will be shorter. Therefore the placement of the incoming wheeled object in this case a object inside these channels will be easier. The side view of this carrier shown in FIG. 19. The details of these carriers are explained in the related figures. Please note this particular carrier is similar to the model shown at FIGS. 16 and 21 and they do not have ramp. Therefore the object will enter directly to the compartment by use of the method explained in the text.

FIG. 20. Shows schematically the cross cut view of a carrier similar to the carrier shown in FIG. 9 except in this model the carrier is made from combination of multiple pieces/components attached to each other so that it allows the distances of different pieces/components from each other to be adjusted in order to allow different wheelchairs/ strollers or similar with different distances between its wheels to be utilized.

FIG. 21. Shows schematically a compartment means such as one shown in FIGS. 3 and 4 with the difference that in this model the carrier does not have a ramp and instead the floor of the compartment is modified by having the channels and oblique walls similar to means shown in FIGS. 16, 9, 20 and 22 so that it will allow the object to be inserted inside this compartment directly and easily by using the steps explained in the text. In this Fig. the sidewall/door is shown in the right by its perimeters at 127, 128 and 129 and is hinged to the rear wall of the compartment by a hinge means shown at 125. This door may be made from combinations of one sheet or more for allowing the adjustment of this side both vertically or horizontally. This door may be made from combination of two doors, one upper door and one lower door. These doors would have lock means to allow them to be locked to the body of the compartment.

FIG. 22. Shows schematically the top view of a floor means for use with a compartment such as one shown in FIG. 21 in which the compartment does not have a ramp so that the incoming objects such as a wheelchair can be directly entered inside the compartment by use of the new method of placement of the object inside the compartment as explained in the text. The details are also explained in related figures.

FIG. 23. Shows schematically the side view of the floor of the compartment shown in FIGS. 21 and 22. Please note in this model the carrier does not have a ramp and instead the floor of the compartment is modified by having the channels and oblique walls for allowing the object to be inserted inside this compartment directly and easily by using the steps explained in the text. This Fig. is similar to right side portion of the FIG. 11 since these units are very similar. In this Fig. the floor of the compartment is shown at 170, which is made from a horizontal sheet of metal, the vertical/perpendicular sidewall 143 is shown as well as the vertical/perpendicular wall 133 from the channel. The front of this floor is shown at 175 and the rear end of the floor (the entrance point to the compartment) is shown at 176 the side view of the oblique wall 147 it shown. Also this Fig. shows the position of the vertical block at 178 which is a removable vertical wall designed to prevent from the smaller front wheel of the wheel chair from falling from the channels 132 and 134. Therefore this Fig. shows the relative size and position of the oblique wall 147 and also the position of the block 178 compared to other components of the floor.

FIG. 24. Shows schematically the side view of the block means shown at 178 which is a rectangular piece and will be vertically/perpendicularly inserted or attached to the lower/entrance ends of channels 142 and 132 from FIG. 22. Or it will be used as piece 49 shown in FIG. 7 to block the ends of the channels 26 and 29.

Importantly: Note this application introduces methods and means for connecting the compartment to the rear part of an automobile so that the connection would be secure and the sturdy for use. These means are shown in FIGS. 12, 13, 14, 15, 25 and 26. Use of these means facilitate and simplify the attachment of the compartments to the rear part of the automobiles. They also provide the option of having the position of the compartment when compared to the rear part of the automobile to be adjustable and be higher, lower, to the right or to the left.

The use of hinges such as one shown schematically at 74 FIGS. 12 and 15 allows the compartment to be swung away from the rear of the automobile or be brought and positioned close to it for being moved. Other methods of moving the compartment away from the rear of the cars is shown at FIGS. 33, 34, 35, and 36 and are explained in those figures.

FIGS. 25 and 26 shows schematically a connection means which is designed for allowing an L-shaped carrier shown at 71, 72 in FIGS. 12 to 15 to be attached to the rear of a vehicle easily. These carriers and methods will make the attachment of the compartment to the automobiles to be much simpler, significantly adjustable and secure. Please note various locking means will be used in order to attach the compartment to the car or pieces which are attached to the car in order to prevent from unwanted movement of the compartment means of a from the wanted position. Importantly a locking means may be also made to lock the hinge and prevent them from moving.

FIG. 27. Shows schematically the side view of a floor of a compartment shown in FIG. 23 except it shows a very important modification shown at the right side of this Fig. by having the end of the floor 170 curving down at point 181 for creating a curved shaped piece 188. This is very important since not only it will help the front wheel of the object to be placed inside this channel with ease but also after the front wheel of the object is inside this part it would be secure and will not move by itself. Also this figure and its related FIG. 28 introduces a model which allows the user to identify the path which the front wheels of the object should land. The light and the zones with reflected colors will help the user significantly in noting where the small wheels should land therefore this process will be significantly simpler. Note many users of the wheelchairs are elderly or compromised patients with vision problems as well. Thus they need every help that they can get for placement of the wheelchair securely with minimum energy. Also importantly the design shown in these figures will make the position of the small object and the entrance to be secure and they cannot move backward and fall. This is also very significant since the user will have a moment or more to rest and get ready for next move of placing the large object into the compartment. Due to similar design for moving the large object the movement of those into the compartment will be significantly easy as well. Therefore the whole process of moving the object into the compartment will be much easier, simpler with less energy expenditure particularly when the steps introduced in this application would be followed.

FIG. 29. Shows schematically the side view of a wheelchair and its parts, please note that the object are made from practically a mirror imaged parts. Therefore many parts are similar and in parallel. Also it is important to note when closed the sides of the wheelchair has tendency to expand laterally due to the squeezing applied to the soft parts the seat and back part which are made from fabric or plastic materials. The sides can be squeezed to make the whole carrier with small width but they will have tendency to expand. This is a function which should be considered when the gadget for holding the wheels together in fixed distance which are discussed in FIGS. 38, 39 and 40. Since the lateral expansion of the carrier and close condition will keep the gadgets in place.

Method of moving the object inside the carrier means with motorized means.

Although the methods and means shown in this application makes moving the object and similar inside the carrier means very easy however in some cases a disabled person would need to have help of motorized means for moving the objects inside the compartment. The applicant has shown in his previous applications such the carriers and in this application he shows one such carrier which makes moving the object inside the compartment with significant ease. Such a carrier is shown in FIG. 30.

Importantly: motorized means can be designed for elevating or moving the object to inside the compartment such as:

1. By attaching the rope to the rotator in the door opposite to that ramp and also to the body of the object and pulling inside the compartment by using an electric winch, as shown here.

2. Electrical Jacks can be attached to elevate the compartment from the ground to moving position.

3. Many other designs may be used for such purpose.

FIG. 30. Shows schematically a motorized means which allows a wheelchair and similar to be pulled inside the compartment easily. The experiment of the applicant has shown that due to the use of channels and the construction of the compartment and its related parts using a motorized means for placement of the object into the compartment is possible with significant ease and practicality. Other devices such as Electrical Jacks can also be attached to elevate the compartment from the ground for higher position also other designs may be used for such purpose.

FIG. 31. Shows schematically the side view of a modified compartment means which is similar to the model shown at FIG. 21 except in this model the carrier comprises from:
  A. A compartment shown on the left side which has an almost half-sized rear wall (half door) shown at 213 which is hinged to the rear wall of the compartment by a vertical hinge 215.
  B. It has another almost half door shown at 212 which is hinged to the lower right end of the floor of the compartment by a horizontal hinge shown at number 214 and is designed for functioning as a half ramp similar to the model shown at FIG. 32. The advantage of this model is that it can be helpful for users who do not need to have the whole ramp all the way down and they can use the method explained in this application which allows the object to be loaded on the ramp with ease.

FIG. 32. Shows schematically the side view of a floor of the compartment shown in FIG. 27 except it shows a very important modification shown at the right side of this Fig. by having the floor 170 and a half rear door/ramp shown in the right side at 247 which is hinged to the floor of the compartment by hinge 183.

Such a modification will make a compartment with a half door/half ramp similar to the carrier shown in FIG. 31. This model gives the advantage of use of half door/half ramp with modification in the entrance of the ramp which will make the use of carrier simpler, easier and more secure. Please note the people have different height, weight and capabilities. The cars also have different sizes and shapes therefore making different models we give the people option to choose a model which will be more useful for them. And this is one such model: it is not a single compartment and is not a carrier with full size ramp, but in between. The pole 284 will secure the position of the ramp on the ground when open and will allow the door to be pulled down to function when closed.

FIGS. 33-36 show schematically three different methods which allow the compartment to be moved away from the rear of a car and allow access to the trunk. The details are explained in the figures, and they show schematically three versions which can be used for us accessing the trunk. Please note various locking means will be used in order to attach the compartment to the car or suitable parts of the car in order to prevent from unwanted movement of the compartment means of a from the wanted position. Importantly a locking means may be also made in the hinges to function as a lock and prevent the hinge from moving.

FIG. 37 shows the floor of a compartment which does not have the ramp. It is a very simpler carrier which can be used by those who have a car with lower height in the back and the user is reasonably capable in moving the object into such compartment. This floor consists of two pieces attached to each other similar to the carrier shown on FIG. 6. Except this figure also shows the presence of four channels on its top surface which are designed for the wheels of the object to move in. The channels are critically helpful in making such a function to occur. Farther more the entrance part of this floor is fortified by zones of reflective means. One such zone is shown in the right side at number 316 and another one is shown at 317. A similar but mirror image channels are present in the left side as well. The zone shown at 316 is covered by a light reflective means with a color such as yellow and will reflect a yellowish light in order to inform the user. The area shown at 317 has similar reflective surface except with different color for example blue to inform the user that the large wheels in the right side are to move on top of this zone. Please note that although these zones are shown to be flat but they may be made to have a three-dimensional makeup with the changes shown in FIGS. 27 and 28. And these zones to move down for making the almost spoon shaped area for accepting the wheel.

FIGS. 38, 39 and 40 schematically show a very important gadget designed for holding the vertical parts of the wheelchairs shown in FIG. 29 at 196 and it's a mirror image counterpart (not shown in FIG. 29) also part 197 and its mirror image counterpart (again not shown in FIG. 29) together in a fixed predesigned position for the purpose of placing the object inside the compartment. By using these gadgets the distance between two mirror image wheels of the object to be in a fixed distance per design. Note the wheels of the object are attached to these parts: the smaller front wheel 193 is attached to the vertical part 196 and the larger rear wheel 190 is attached to the vertical part 197 or the horizontal part of the handle 195. Therefore using these gadgets will keep the wheels of the object in stable and controlled distances. Having fixed and controlled distances of the wheels from each other is a very crucial and critical issue for the whole this system to work since it will make it possible for the front and the rear wheels to have the desired and matching distances needed for entering the channels shown in previous figures such as FIG. 22 and similar for moving forward and backward. This is because in a given model of the compartment the distances of the channels from each other are fixed for use and the distance of the wheels has to match those distances of the channels for the system to work. Please note importantly without such a gadget or a similar control means of various kinds the distances of the wheels of the object may match the distances of the channels and cannot enter. Without use of the channels, controlling of the object inside the compartment will be very difficult.

FIG. 38 shows schematically a gadget designed for holding the vertical parts of the objects shown in FIG. 29 at 196 and it's a mirror image counterpart (not shown in FIG. 29) also part 197 and its mirror image counterpart (again not shown in FIG. 29) together in a fixed predesigned position for the purpose of placing the object inside the compartment. So that in a folded condition the distance between these two parts of the object to be fixed per designs. At the time of use the cane shape ends of the gadget shown at 318 and 319 will be positioned to hold the vertical piece 196 and its counterpart in the other side. The desired distance of the vertical parts can be decided based on tightening of the screw 320 which will allow the total length of this gadget to be decided. Please note at the time of use two of such gadgets will be used, one for the front part 196 and its counterpart and the second one will be used for holding the handle part or the piece 197 and its counterpart together. Please note that such a gadget may be modified so that one end of it could rotate around one part such as part 196 so that it would not fall as shown in FIG. 40. Also the piece 319 may be made from spring in order to engage and disengage from the related content part of the vertical pole 196. Alternatively a resilient piece of Velcro® tape may be used as shown in FIG. 39 in order to wrap around the two vertical parts 196 and 197 and their counterparts in the desired distance from each other and another one for the control of the rear wheels. The applicant has used such a carrier successfully in his experiments. In this model shown at FIG. 39 the zone of Velcro® loop is shown at 321 and the zone of Velcro® hook is shown at 322 so that the Velcro® loop type part goes around the two vertical pieces and will hold them in the wanted distance by use of the Velcro® hook attached to Velcro® loop shown at 322.

FIG. 40. Shows schematically a clamp means similar to one shown on FIG. 38 which is modified so that one end of this gadget has a circular construction made of two semi-circular pieces shown at 323 and 324 which have extensions attached to each other by screws one shown on 326. This end is around the vertical piece 196 from the object and can rotate around the vertical piece 196 from the lower front wheel. The other end has a spring means shown at 327 which has its end piece 328 allowing this spring means to get engaged with the other vertical pole shown at 325A from the object and hold them securely. The distance of these two pieces can be modified by use of the screw means shows in the center at 325.

Methods of attachment of the carrier means to the automobiles.

This applicant has previously introduced the methods of attachment for the automobiles by using the L-shaped base which attaches to the rear part of an automobile by use of hinges as follows.

A. A vertical hinge which allows the carrier means to be rotated on the vertical hinge in order to move away from the trunk of the car.

B. A horizontal hinge which allows the carrier means to be rotated on the horizontal hinge in order to move away from the trunk of the car.

It should be noted that some users who do not use the trunk may have the compartment directly attached to the car without means of moving them away from the trunk. In such cases it is possible to attach the carrier means directly to the rear of the car by use of attachment means such as the attachment means shown in FIGS. 25 and 26 in this application. Combinations of these methods will make other choices possible. In an aspect, the size, shape, relative sizes of the parts of these objects, the colors and materials used and all other important items of these objects may vary for allowing different models to be made.

The invention claimed is:

1. A carrier for attachment to a motor vehicle to allow an object which rolls on wheels to be loaded onto the carrier for transport by the motor vehicle and unloaded from the carrier, the carrier comprising:
   a platform for providing underlying support for an object which rolls on wheels when the object is on the platform;
   a mounting extending from the platform for mounting the platform on an exterior of a motor vehicle;
   at least one lengthwise extending channel having an entrance through which a wheel of the object can enter the channel and roll onto and along the platform when the object is being loaded onto the carrier, the channel having a bottom wall and laterally spaced apart, mutually confronting side walls which extend upward from lateral ends of the bottom wall for laterally constraining the wheel to locate the object laterally on the platform;
   one side wall having, along at least some of the channel's length, a lower portion extending upward from the bottom wall and an upper portion extending upward and inclining laterally outward from the lower portion.

2. A carrier as set forth in claim further comprising a block which is disposed at the entrance of the channel for preventing the wheel from being rolled through the entrance of the channel.

3. A carrier as set forth in claim 1 including an adjustment for adjusting the lateral distance between the side walls.

4. A carrier as set forth in claim in which the platform comprises a horizontal floor, a portion of which forms the bottom wall of at least some of the length of the channel, and the side walls extend upward from the floor.

5. A carrier as set forth in claim in which the at least one lengthwise extending channel comprises two laterally spaced apart, lengthwise extending, channels within which a respective wheel of the object can roll.

6. A carrier as set forth in claim 5 including an adjustment for adjusting the lateral distance between the two channels.

7. A carrier as set forth in claim 1 further comprising a ramp which inclines downward from the platform and on which the object can roll when being loaded onto and unloaded from the carrier, the platform comprising some of the length of the at least one channel and the ramp comprising more of the length of the at least one channel.

8. A carrier as set forth in claim 7 in which the ramp is hinged on the platform and when downwardly inclined, the ramp can be swung upward to form at least a portion of a wall of an enclosure on the platform for enclosing the object when the object is on the platform.

9. A carrier as set forth in claim 8 in which the ramp, when swung upward to form at least a portion of a wall of an enclosure, forms a first portion of that wall, the enclosure comprising a second portion which cooperates with the first portion in forming that wall.

10. A carrier as set forth in claim 1 in which the mounting comprises a flexible strap and a bar which extend away from the platform.

11. A carrier as set forth in claim 1 in which the entrance of the at least one channel includes a visible marker for shining light to indicate the entrance when aligning a wheel of the object to the entrance when the object is to be loaded onto the platform.

12. A carrier as set forth in claim 1 in combination with an object which rolls on wheels, the object being laterally expansible and contractible, and further including a device which sets a first wheel of the object at a selected lateral distance from a second wheel of the object which rolls in a channel.

13. A carrier as set forth in claim 1 further comprising an enclosure on the platform for enclosing the object when the object is on the platform, and a hinge for swinging the platform and enclosure about an axis relative to a motor vehicle.

14. A carrier as set forth in claim 1 in which the entrance comprises an upwardly open depression into which a wheel of the object can be placed at rest as the object is being loaded onto the carrier and out of which the wheel can be rolled as the object is advanced onto the platform, the upwardly open depression comprising a concavely shaped surface on which the wheel can rest prior to being advanced onto the platform.

15. A carrier as set forth in claim 14 further comprising a wall which extends upward from the depression for preventing the wheel of the object which has been placed in the depression from rolling out of the depression in a direction away from the platform.

16. A carrier as set forth in claim 15 in which the depression is in a ramp which is hinged on the platform for swinging about a horizontal axis which allows the ramp to incline downwardly away from the platform for loading the object onto the platform.

17. A carrier as set forth in claim 16 including a pole for providing support of the ramp on an underlying surface to prevent the ramp from touching the underlying surface when the ramp inclines downwardly.

18. A carrier for attachment to a motor vehicle to allow an object which rolls on wheels to be loaded onto the carrier for transport by the motor vehicle and unloaded from the carrier, the carrier comprising:
- a platform for providing underlying support for an object which rolls on wheels when the object is on the platform;
- a mounting extending from the platform for mounting the platform on an exterior of a motor vehicle;
- the platform comprising at least one channel within which a wheel of the object can roll, the channel having laterally spaced apart side walls for laterally constraining the wheel to locate the object laterally on the platform;
- the platform comprising at least two laterally spaced apart channels within which a respective wheel of the object can roll;
- including an adjustment for adjusting the lateral distance between two of the channels; and
- in which the platform comprises at least two floor parts each containing a respective one of the two channels, and an adjustment for laterally adjusting the two floor parts relative to each other to adjust the lateral distance between the two channels.

19. A carrier as set forth in claim 18 further comprising an enclosure for enclosing the object, the enclosure having at least two enclosure parts which are disposed on respective floor parts and are laterally adjustable with lateral adjustment of the respective floor parts.

20. A carrier as set forth in claim 19 in which each enclosure part comprises at least one recess shaped to receive at least a portion of a respective wheel of the object when the object is supported on the platform.

21. A carrier for attachment to a motor vehicle to allow an object which rolls on wheels to be loaded onto the carrier for transport by the motor vehicle and unloaded from the carrier, the carrier comprising:
- a platform for providing underlying support for an object which rolls on wheels when the object is on the platform;
- a mounting extending from the platform for mounting the platform on an exterior of a motor vehicle;
- and an entrance to the platform comprising an upwardly open depression into which a wheel of the object can be placed as the object is being loaded onto the carrier and out of which the wheel can be rolled as the object is advanced onto the platform, and a wall which extends upward from the depression for preventing the wheel of the object which has been placed in the depression from rolling out of the depression in a direction away from the platform, the upwardly open depression comprising a concavely shaped surface on which the wheel can rest prior to the object being further advanced onto the platform.

22. A carrier as set forth in claim 21 in which the depression is in a ramp which forms the entrance to the platform and is hinged on the platform for swinging about a horizontal axis which allows the ramp to incline downwardly away from the platform for loading the object onto the platform by rolling the object up the ramp and onto the platform.

23. A carrier for attachment to a motor vehicle to allow an object which rolls on wheels to be loaded onto the carrier for transport by the motor vehicle and unloaded from the carrier, the carrier comprising:
- a platform for providing underlying support for an object which rolls on wheels when the object is on the platform;
- a mounting extending from the platform for mounting the platform on an exterior of a motor vehicle;
- the platform comprising a first lengthwise extending channel through which a first wheel of the object can roll, and a second lengthwise extending channel through which a second wheel of the object can roll, the first channel having an upwardly open depression into which the first wheel of the object can be placed before before the object is rolled further along the first channel and before the second wheel enters the second channel, the first channel having laterally spaced apart, mutually confronting side walls for laterally constraining the first wheel to laterally locate the first wheel on the platform;
- portions of both side walls of the first channel being laterally adjacent the depression with at least one of those laterally adjacent portions having a lower portion extending upward and an upper portion extending further upward from the lower portion while also inclining laterally outward from the lower portion;
- and the upwardly open depression comprising a concavely shaped surface on which the first wheel can rest prior to the object being further advanced onto the platform.

24. A carrier as set forth in claim 23 in which the second channel comprises a depression having an upwardly open concave surface on which the second wheel can rest after the object rolls further onto the platform to cause the first wheel to move out of the first depression and the second wheel to enter the second channel.

* * * * *